United States Patent
Peterson et al.

(10) Patent No.: US 11,590,659 B2
(45) Date of Patent: Feb. 28, 2023

(54) ROBOTIC SORTATION SYSTEM

(71) Applicant: INTELLIGRATED HEADQUARTERS, LLC, Mason, OH (US)

(72) Inventors: Justin Peterson, Louisville, KY (US); Thomas Gallagher, Simpsonville, KY (US); Gary Giuliano, Cincinnati, OH (US); Justin Zimmer, Dayton, OH (US); Stephen Dryer, Cincinnati, OH (US); Matt Wicks, St. Charles, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 76 days.

(21) Appl. No.: 16/781,877

(22) Filed: Feb. 4, 2020

(65) Prior Publication Data

US 2021/0001489 A1 Jan. 7, 2021

Related U.S. Application Data

(60) Provisional application No. 62/869,900, filed on Jul. 2, 2019.

(51) Int. Cl.
*B25J 19/04* (2006.01)
*B25J 9/16* (2006.01)
(Continued)

(52) U.S. Cl.
CPC ............. *B25J 9/1697* (2013.01); *B07C 5/362* (2013.01); *B25J 13/08* (2013.01); *B25J 19/04* (2013.01); *B07C 2501/0063* (2013.01)

(58) Field of Classification Search
CPC .......... B25J 9/1697; B25J 13/08; B25J 19/04; B07C 5/362; B07C 2501/0063; B07C 5/02; B07C 5/3422; G06Q 50/28; G06Q 10/08
(Continued)

(56) References Cited

U.S. PATENT DOCUMENTS 5,305,892 A * 4/1994 Kronseder ............... B07C 5/36
                                                    209/523
5,881,886 A * 3/1999 Lawandy ............... A61N 5/062
                                                    209/3.3
(Continued)

FOREIGN PATENT DOCUMENTS

CN     101443247 A     5/2009
CN     103357594 A    10/2013
(Continued)

OTHER PUBLICATIONS

Extended European Search Report for Patent Application No. 20182395.2 dated Aug. 10, 2020, 8 pages.
(Continued)

*Primary Examiner* — Jaime Figueroa
(74) *Attorney, Agent, or Firm* — Alston & Bird LLP

(57) ABSTRACT

Methods, apparatus, computing devices, computing entities, and/or the like associated with a robotic sortation system are provided. An example method may include receiving imaging data associated with a first item at a first sorting location of a material handling system, determining a sorting destination for the first item based at least in part on the imaging data, determining a plurality of first-tier robotic devices and a plurality of second-tier robotic devices based at least in part on the first sorting location and the sorting destination, and generating a first sortation scheme for the first item.

20 Claims, 15 Drawing Sheets

(51) Int. Cl.
    *B25J 13/08*     (2006.01)
    *B07C 5/36*     (2006.01)

(58) Field of Classification Search
    USPC .................................................. 700/245–264
    See application file for complete search history.

(56) References Cited

U.S. PATENT DOCUMENTS

| | | | | |
|---|---|---|---|---|
| 7,474,212 | B2 * | 1/2009 | Nakagawa | G05B 19/128 |
| | | | | 382/137 |
| 8,020,688 | B2 * | 9/2011 | Kilian | B65G 1/04 |
| | | | | 198/346.2 |
| 8,594,834 | B1 * | 11/2013 | Clark | G06Q 10/087 |
| | | | | 700/214 |
| 8,639,382 | B1 * | 1/2014 | Clark | G06Q 10/087 |
| | | | | 700/214 |
| 8,798,784 | B1 * | 8/2014 | Clark | G06Q 10/08 |
| | | | | 700/214 |
| 9,050,719 | B2 * | 6/2015 | Valpola | B25J 9/1697 |
| 9,481,516 | B1 * | 11/2016 | Kraus | B65G 47/82 |
| 10,163,149 | B1 | 12/2018 | Famularo et al. | |
| 10,217,074 | B1 * | 2/2019 | Stallman | G06Q 10/08 |
| 10,493,627 | B2 * | 12/2019 | Katou | B25J 9/0018 |
| 10,625,305 | B2 * | 4/2020 | Wagner | B07C 3/008 |
| 2005/0056573 | A1 * | 3/2005 | Berdelle-Hilge | B07C 5/36 |
| | | | | 209/584 |
| 2007/0208455 | A1 * | 9/2007 | Bollegraaf | B07C 5/36 |
| | | | | 700/223 |
| 2007/0209976 | A1 * | 9/2007 | Worth | B07C 3/08 |
| | | | | 209/584 |
| 2009/0211952 | A1 | 8/2009 | Berdelle-Hilge | |
| 2011/0243707 | A1 * | 10/2011 | Dumas | B65B 5/105 |
| | | | | 700/259 |
| 2013/0110280 | A1 * | 5/2013 | Folk | B25J 15/0057 |
| | | | | 700/215 |
| 2013/0151007 | A1 * | 6/2013 | Valpola | B25J 9/1697 |
| | | | | 901/9 |
| 2016/0199884 | A1 | 7/2016 | Lykkegaard et al. | |
| 2016/0263622 | A1 * | 9/2016 | El Bernoussi | B25J 9/1687 |
| 2017/0157648 | A1 | 6/2017 | Wagner et al. | |
| 2018/0088586 | A1 | 3/2018 | Hance et al. | |
| 2018/0127219 | A1 | 5/2018 | Wagner et al. | |
| 2019/0333006 | A1 | 10/2019 | Velten et al. | |
| 2020/0097895 | A1 * | 3/2020 | Deng | G06Q 10/087 |
| 2020/0242315 | A1 * | 7/2020 | George | G06K 19/0723 |

FOREIGN PATENT DOCUMENTS

| | | | |
|---|---|---|---|
| CN | 106452903 | A | 2/2017 |
| CN | 107458828 | A | 12/2017 |
| CN | 107563708 | A | 1/2018 |
| CN | 107617573 | A | 1/2018 |
| CN | 109807068 | A | 5/2019 |
| CN | 109848050 | A | 6/2019 |

OTHER PUBLICATIONS

Bershire Grey, Articulated Arm Robot Guided by Vision, Picking From Bulk, Putting to Shuttle/Small Sorter Solution for Final Sort online] [retrieved Apr. 17, 2020] retrieved from the Internet URL: https://www.berkshiregrey.com/solutions/dynamic-parcel-sortation/, 9 pages.
Kindred/ai, Articulated Arm Robot Guided by Vision, Picking From Batch Picked Items and Sorting to a 360 Degree Putwall [online] [retrieved on Apr. 17, 2020] retrieved from the Internet URL: https://www.kindred.ai/products, 4 pages.
Office Action received for European Application No. 20182395.2, dated Aug. 20, 2021, 9 pages.
Office Action issued in Chinese Application No. 202010626083.0 dated Oct. 26, 2021, 7 pages.
CN Office Action dated Jun. 7, 2022 for CN Application No. 202010626083.
Summons to Attend Oral Proceedings for EP Application No. 20182395.2 dated Jul. 6, 2022, 10 pgs.
CN Notice of Allowance dated Jan. 5, 2023 for CN Application No. 202010626083.
English Translation of CN Office Action dated Jan. 5, 2023 for CN Application No. 202010626083.
CN Office Action dated Sep. 19, 2022 for CN Application No. 202010626083.
EP Office Action dated Aug. 20, 2021 for EP Application No. 20182395.

\* cited by examiner

ROBOTIC SORTATION SYSTEM

CROSS-REFERENCE TO RELATED APPLICATION

The present application claims priority to and benefit of U.S. Provisional Patent Application No. 62/869,900, filed on Jul. 2, 2019, the entire content of which is incorporated by reference into the present application.

TECHNICAL FIELD

The present application relates generally to a robotic sortation system for sorting items in a material handling environment.

BACKGROUND

Material handling systems may sort, convey, and organize items (which may correspond to physical items, parcels, objects, elements, devices, cartons, cases, containers, shipment boxes, totes, packages, and/or the like). Applicant has identified many deficiencies and problems associated with existing material handling systems. For example, many methods, apparatus, and systems fail to complete item sortation and/or conveyance when one or more components of the material handling system fail to operate.

BRIEF SUMMARY

In general, embodiments of the present disclosure provide methods, apparatus, systems, computing devices, computing entities, and/or the like.

In accordance with one aspect, an apparatus is provided. The apparatus may comprise at least one processor and at least one non-transitory memory comprising a computer program code. The at least one non-transitory memory and the computer program code may be configured to, with the at least one processor, cause the apparatus to: receive imaging data associated with a first item at a first sorting location of a material handling system; determine a sorting destination for the first item based at least in part on the imaging data; determine a plurality of first-tier robotic devices and a plurality of second-tier robotic devices from one or more robotic devices based at least in part on the first sorting location and the sorting destination; generate a first sortation scheme for the first item, wherein the first sortation scheme indicates a first sortation path associated with at least one of the plurality of first-tier robotic devices and at least one of the plurality of second-tier robotic devices of the material handling system; and cause the at least one of the plurality of first-tier robotic devices and the at least one of the plurality of second-tier robotic devices to transport the first item based at least in part on the first sortation scheme.

In some examples, the at least one non-transitory memory and the computer program code may be configured to, with the at least one processor, cause the apparatus to further determine an item identification associated with the first item based at least in part on the imaging data, wherein determining the sorting destination may be further based on the item identification.

In some examples, the imaging data may comprise a scanned image of the first item. In some examples, when determining the item identification, the at least one non-transitory memory and the computer program code may be configured to, with the at least one processor, cause the apparatus to further identify an item label based on the scanned image.

In some examples, the plurality of second-tier robotic devices may be downstream of the plurality of first-tier robotic devices in the first sortation path.

In some examples, the at least one non-transitory memory and the computer program code may be configured to, with the at least one processor, cause the apparatus to further: select a first-tier robotic device from the plurality of first-tier robotic devices; and select a second sorting location associated with a second-tier robotic device of the plurality of second-tier robotic devices.

In some examples, when selecting the first-tier robotic device, the at least one non-transitory memory and the computer program code may be configured to, with the at least one processor, cause the apparatus to further: determine a corresponding load indicator associated with each of the plurality of first-tier robotic devices. In some examples, the corresponding load indicator may indicate a number of items that are assigned to each of the plurality of first-tier robotic devices. In some examples, selecting the first-tier robotic device may be based at least in part on the corresponding load indicator.

In some examples, the at least one non-transitory memory and the computer program code may be configured to, with the at least one processor, cause the apparatus to further calculate a corresponding processing time of each of the plurality of first-tier robotic devices based at least in part on the corresponding load indicator. In some examples, selecting the first-tier robotic device may be further based on the corresponding processing time.

In some examples, when selecting the first-tier robotic device, the at least one non-transitory memory and the computer program code may be configured to, with the at least one processor, cause the apparatus to further determine a corresponding schedule indicator associated with each of the plurality of first-tier robotic devices. In some examples, selecting the first-tier robotic device may be based at least in part on the corresponding schedule indicator.

In some examples, the corresponding schedule indicator may indicate a maintenance schedule associated with each of the plurality of first-tier robotic devices.

In some examples, when selecting the second sorting location associated with the second-tier robotic device, the at least one non-transitory memory and the computer program code may be configured to, with the at least one processor, cause the apparatus to further determine a corresponding load indicator associated with each of the plurality of second-tier robotic devices. In some examples, selecting the second sorting location may be based at least in part on the corresponding load indicator.

In some examples, when selecting the second sorting location associated with the second-tier robotic device, the at least one non-transitory memory and the computer program code may be configured to, with the at least one processor, cause the apparatus to further determine a corresponding schedule indicator associated with each of the plurality of second-tier robotic devices. In some examples, selecting the second sorting location may be based at least in part on the corresponding schedule indicator.

In some examples, the at least one non-transitory memory and the computer program code may be configured to, with the at least one processor, cause the apparatus to further: cause the second-tier robotic device to transport the first item from the second sorting location to the sorting destination.

In some examples, when generating the first sortation scheme for the first item, the at least one non-transitory memory and the computer program code may be configured to, with the at least one processor, cause the apparatus to further: determine a plurality of sorting locations based at least in part on the first sorting location and the sorting destination; and determine the first sortation path based at least in part on the plurality of sorting locations.

In some examples, the at least one non-transitory memory and the computer program code may be configured to, with the at least one processor, cause the apparatus to further: determine a plurality of placement locations for the one or more robotic devices to execute the first sortation path.

In some examples, the at least one non-transitory memory and the computer program code may be configured to, with the at least one processor, cause the apparatus to further: calculate a plurality of candidate paths associated with one or more of the plurality of sorting locations; calculate a plurality of transport times associated with the plurality of candidate paths; and select a candidate path, from the plurality of candidate paths, that is associated with a least transport time among the plurality of transport times.

In some examples, each of the plurality of candidate paths may be associated with at least one robotic device of the one or more robotic devices.

In some examples, the first sortation path may be associated with a first robotic device and a second robotic device. In some examples, the second robotic device may be downstream in the first sortation path of the first robotic device. In some examples, the at least one non-transitory memory and the computer program code may be configured to, with the at least one processor, cause the apparatus to further: cause the first robotic device to transport the first item to a second sorting location associated with the second robotic device; in response to determining that the second robotic device is associated with a predefined indicator, determine a third robotic device from the one or more robotic devices; and cause the third robotic device to transport the first item from the second sorting location to the sorting destination.

In some examples, the predefined indicator may comprise at least one of: (1) an indication that the second robotic device is offline, or (2) an error message associated with the second robotic device.

In some examples, when determining the third robotic device from the one or more robotic devices, the at least one non-transitory memory and the computer program code may be configured to, with the at least one processor, cause the apparatus to further: calculate a plurality of processing times associated with the one or more robotic devices; and select the third robotic device associated with a least processing time among the plurality of processing times.

In some examples, the at least one non-transitory memory and the computer program code may be configured to, with the at least one processor, cause the apparatus to further generate a corresponding presorting scheme indicating the first sorting location for the first item.

In some examples, the material handling system may comprise a conveyor and a plurality of sorting cells connected to the conveyor via a plurality of divert paths. In some examples, the first sorting location may be associated with one of the plurality of sorting cells.

In some examples, the conveyor may comprise at least one of: (1) a shoe sorter, or (2) a paddle sorter.

In accordance with one aspect, a computer-implemented method may be provided. The computer-implemented method may comprise: receiving imaging data associated with a first item at a first sorting location of a material handling system; determining a sorting destination for the first item based at least in part on the imaging data; determining a plurality of first-tier robotic devices and a plurality of second-tier robotic devices from one or more robotic devices based at least in part on the first sorting location and the sorting destination; generating a first sortation scheme for the first item, wherein the first sortation scheme indicates a first sortation path associated with at least one of the plurality of first-tier robotic devices and at least one of the plurality of second-tier robotic devices of the material handling system; and causing the at least one of the plurality of first-tier robotic devices and the at least one of the plurality of second-tier robotic devices to transport the first item based at least in part on the first sortation scheme.

In accordance with one aspect, a computer program product may be provided. The computer program product may comprise at least one non-transitory computer-readable storage medium having computer-readable program code portions stored therein. The computer-readable program code portions may comprise an executable portion configured to: receive imaging data associated with a first item at a first sorting location of a material handling system; determine a sorting destination for the first item based at least in part on the imaging data; determine a plurality of first-tier robotic devices and a plurality of second-tier robotic devices from one or more robotic devices based at least in part on the first sorting location and the sorting destination; generate a first sortation scheme for the first item, wherein the first sortation scheme indicates a first sortation path associated with at least one of the plurality of first-tier robotic devices and at least one of the plurality of second-tier robotic devices of the material handling system; and cause the at least one of the plurality of first-tier robotic devices and the at least one of the plurality of second-tier robotic devices to transport the first item based at least in part on the first sortation scheme.

In accordance with one aspect, a robotic sortation system for a material handling system may be provided. The robotic sortation system may comprise at least one mobile robot comprising at least one Autonomous Mobile Robot (AMR) unit or at least one Automated Guided Vehicle (AGV) unit, at least one robotic arm, and a controller electronically coupled to the at least one mobile robot and the at least one robotic arm. In some examples, the controller may comprise at least one processor and at least one non-transitory memory comprising a computer program code. In some examples, the at least one non-transitory memory and the computer program code may be configured to, with the at least one processor, cause the controller to: determine a sorting destination for an item at a first sorting location in the material handling system; generate a sortation scheme for the item based on the sorting destination, wherein the sortation scheme indicates a sortation path associated with the at least one mobile robot and the at least one robotic arm; and cause the at least one mobile robot and the at least one robotic arm to transport the item based at least in part on the sortation scheme.

In some examples, the at least one non-transitory memory and the computer program code may be configured to, with the at least one processor, cause the controller to further: select a first robotic arm and a second robotic arm from the at least one robotic arm based at least in part on the first sorting location and the sorting destination.

In some examples, when selecting the first robotic arm and the second robotic arm, the at least one non-transitory memory and the computer program code may be configured to, with the at least one processor, cause the controller to further: determine a corresponding load indicator associated with each of at least one robotic arm.

In some examples, when selecting the first robotic arm and the second robotic arm, the at least one non-transitory memory and the computer program code may be configured to, with the at least one processor, cause the controller to further: determine a corresponding schedule indicator associated with each of at least one robotic arm.

In some examples, the at least one non-transitory memory and the computer program code may be configured to, with the at least one processor, cause the controller to further: cause the first robotic arm to transport the item to the at least one of the first AMR unit or the first AGV unit; and cause the at least one of the first AMR unit or the first AGV unit to transport the item to a second sorting location associated with the second robotic arm.

In some examples, the second sorting location may be a sorting table.

In some examples, the second sorting location may be a cell of a robotic put wall.

In some examples, the at least one non-transitory memory and the computer program code may be configured to, with the at least one processor, cause the controller to further: cause the second robotic arm to transport the item from the second sorting location to the at least one of the first AMR unit or the first AGV unit.

In some examples, the at least one non-transitory memory and the computer program code may be configured to, with the at least one processor, cause the controller to further: cause the at least one of the first AMR unit or the first AGV unit to transport the item to a third sorting location.

In some examples, the third sorting location may be a mail sack mounted on a cart.

In some examples, the at least one non-transitory memory and the computer program code may be configured to, with the at least one processor, cause the controller to further: cause the at least one of the first AMR unit or the first AGV unit to transport the cart to the sorting destination.

In some examples, the at least one non-transitory memory and the computer program code may be configured to, with the at least one processor, cause the controller to further: cause a sorting device to seal the mail sack; and cause the sorting device to sort the mail sack to the sorting destination.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
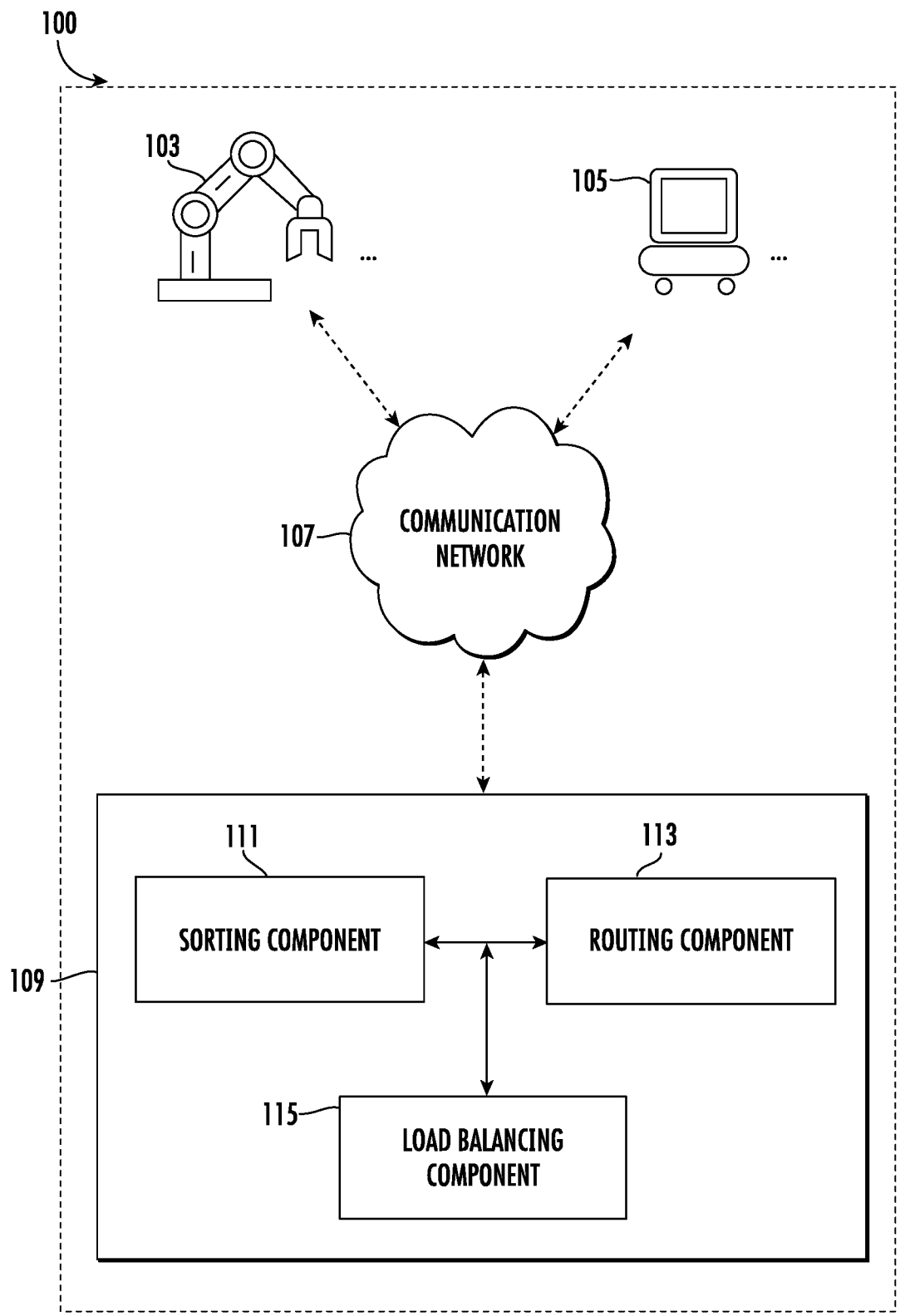
FIG. 1 is an example system architecture diagram in accordance with various aspects and embodiments of the present disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

The term "or" is used herein in both the alternative and conjunctive sense, unless otherwise indicated. The terms "illustrative," "example," and "exemplary" are used to be examples with no indication of quality level. used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The terms "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment). While a particular feature may have been disclosed with respect to only one of several implementations, such feature may be combined with one or more other features of the other implementations as may be desired and advantageous for any given or particular application.

The terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The terms "user equipment," "user device," "mobile device," "mobile," "station," "access terminal," "terminal," "handset" generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

The terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Various embodiments disclosed herein provide for a robotic sortation system that may, for example, improve sortation speed and efficiency, provide options for load-balancing, and/or dynamically adjust internal routing of packages and items in a material handling environment.

Material handling systems may rely on a conveyor controller and/or warehouse management system to organize items conveyed and/or handled. However, many systems are plagued by limitations and restrictions. For example, many systems consume a large footprint and require a minimum daily volume of items to justify the cost. For lower volume items, some systems may feed a shuttle system, which may take a large footprint and can be limited in the number of items that can be handled.

In addition, in an effort to reduce parcel delivery costs, many systems have taken on more of the processing burden. One such task is sorting down to the zip-code or delivery route level. This may reduce the rate charged by the last mile delivery entity. However, it can be challenging to achieving this level of granularity off a high-speed sorter due to the limited number of sort lanes as compared to the number destinations required. For example, some systems may implement a process having two parts, a primary sort consolidating several last mile destinations followed by a secondary sort. The secondary sort can be labor intensive, time/space consuming, error prone, and can create congestion that limits throughput and velocity within the material handling system.

In contrast, systems structured in accordance with various embodiments of the disclosure provide specific, technical solutions to these problems. For example, examples of the present disclosure may provide solutions that are more flexible, may offer the ability to dynamically accept new items over time, and/or may consume a smaller footprint as compared to other systems. In some examples, by implementing one or more robotic devices, examples of the present disclosure may reduce labor cost while performing at a predicable rate and enabling higher throughput and conveyance accuracy within the system, details of which are described herein.

FIG. 1 provides an example system architecture diagram illustrating an example material handling system 100 within which embodiments of the present disclosure may operate. The material handling system 100 may comprise one or more robotic devices (including at least one robotic arm 103 and/or at least one mobile robot 105) and a computing entity 109, details of which are described herein.

In the present disclosure, the term "robotic device" refers to a machine that may be configured to execute one or more motions, actions, and/or functions based on computer program instructions that may be generated and/or received from a processing circuitry. Example robotic devices may include, but not limited to, robotic arms and mobile robots, as described below. Each robotic device may be associated with a robotic device identifier that may uniquely identify a robotic device within the material handling system.

In the present disclosure, the term "robotic arm" refers generally to a mechanical arm that may be programmed and/or controlled by a computing entity (such as the computing entity 109 as shown in FIG. 1). In some examples, a robotic arm may comprise one or more parts that may be linked and/or connected together, allowing rotational motion and/or linear motion of the robotic arm. In some examples, a computing entity may execute one or more programming instructions, causing the robotic arm to perform one or more motions, actions and/or functions. For example, the computing entity may cause a robotic arm to grip, pick up, move, convey, transport, release, place, flip, and/or otherwise manipulate an item of the material handling system. An example robotic arm is illustrated and described in connection with at least FIG. 3 herein.

In the present disclosure, the term "mobile robot" refers a machine that may be programmed and/or controlled by a computing entity (such as the computing entity 109 as shown in FIG. 1) to navigate and/or move within the material handling system. For example, the computing entity 109 may transmit data to the at least one mobile robot 105 to cause the at least one mobile robot 105 to travel along a path and/or to transport one or more items based on data received from the computing entity 109.

In some examples, an example mobile robot may comprise one or more wheels, one or more motors for driving the wheels, one or more steering mechanisms for controlling the wheels, and one or more microcontrollers that may control the operations of the mobile robot, and one or more power supplies. In some examples, an example mobile robot may comprise and/or be mounted to one or more item holding mechanisms (such as, but not limited to, shelf units, pallets, containers, and/or the like), such that the mobile robot may transport items from one location to another location.

In some examples, a mobile robot may implement one or more positioning technologies to identify its position and/or location, and/or interpret location data that it received from, from example, a processing circuitry that may indicate a destination location. For example, an example mobile robot may include outdoor positioning aspects, such as a location module adapted to acquire and/or analyze, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, an example mobile robot may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

In some examples, a mobile robot may implement one or more sensing technologies to identify its operation status and/or its surroundings with the material handling system. For example, an example mobile robot may include one or more proprioceptive sensors and/or one or more exteroceptive sensors. The one or more proprioceptive sensors may measure internal values, parameters, and/or status associated with the mobile robot, such as, but not limited to, battery level, temperature, wheel position, and/or the like. Example proprioceptive sensors may include, but not limited to, potentiometers, speedometers, gyroscopes, acceleration sensor, and/or the like. The one or more exteroceptive sensors may provide measurement and/or observation related to objects and/or environments that may be proximate to the mobile robot. Example exteroceptive sensors may include, but are not limited to, proximity sensor, sonar sensors, distance sensor, infrared (IR) sensors, collusion sensor, and/or the like.

In the present disclosure, example mobile robots may comprise a variety of different types, including, but not limited to, an automated guided vehicle (AGV) unit and an autonomous mobile robot (AMR) unit.

For example, an example mobile robot may be an AGV unit. An AGV unit may rely on guidance devices (including mechanical, electro-mechanical, and/or electronic guidance devices) that allow them to travel along one or more pre-defined navigation routes in a controlled space within the material handling system. For example, an example AGV unit may be guided by one or more lines or wires on the floor that may provide the one or more pre-defined navigation routes. Additionally, or alternatively, an example AGV unit may be a "vision-guided" AGV unit that comprises a camera to capturing imaging data along the one or more pre-defined routes, and may allow the AGV unit to replay the one or more routes based on the imaging data. Additionally, or alternatively, other technologies may be implemented to guide the AGV unit to navigate the one or more pre-defined routes, including, but not limited to, radio waves, magnets, lasers, and/or the like.

As another example, an example mobile robot may be an AMR unit. In comparison with an AGV unit, an AMR unit may navigate an uncontrolled environment in the material handling system without the need for guidance devices. For example, an AMR unit may implement one or more positioning technologies to identify its position and/or location, including outdoor positioning aspects and/or indoor positioning aspects, similar to those described above.

While the above description provides example types of robotic devices such as robotic arms and mobile robots, it is noted that the scope of the present disclosure is not limited to these specific types of robotic devices. In some examples, other types of robotic devices may be implemented in accordance with various examples of the present disclosure, including, but is not limited to, robotic conveyors.

Referring back to FIG. 1, one or more robotic devices (including at least one robotic arm 103 and/or at least one mobile robot 105) may transmit and/or receive data to/from the computing entity 109. As used herein, the terms "data," "content," "digital content," "digital content object," "information," and similar terms may be used interchangeably to refer to data capable of being transmitted, received, and/or stored in accordance with embodiments of the present disclosure.

In some examples, an example robotic arm and/or an example mobile robot may include communication modules for receiving data from and/or transmit data to one or more other components of the material handling system 100 (such as a robotic arm 103, a mobile robot 105, and/or the computing entity 109) through wired means (such as a system communication bus) and/or wireless means. For example, an example robotic arm and/or an example mobile robot may comprise an antenna, a transmitter, a receiver, and/or the like. The signals provided to and received from the antenna, the transmitter and/or the receiver may include signaling information/data in accordance with an air interface standard of applicable wireless systems to communicate with various entities, such as another robotic arm, another mobile robot, the computing entity, and/or the like. In this regard, the example robotic arm and/or the example mobile robot may be capable of operating with one or more air interface standards, communication protocols, modulation types, and access types. More particularly, the example robotic arm and/or the example mobile robot may comprise a network interface, and may operate in accordance with any of a number of wireless communication standards and protocols. In a particular embodiment, the example robotic arm and/or the example mobile robot may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

In FIG. 1, an example block diagram of the computing entity 109 is illustrated. In an embodiment, the computing entity 109 may be a device, server, or other control system that can direct the motion, action, function, movement and/or actions of various components of the material handling system 100 (including at least one robotic arm 103 and/or at least one mobile robot 105). In an embodiment, the computing entity 109 can be located at or proximate to one or more robotic devices (including at least one robotic arm 103 and/or at least one mobile robot 105). In some embodiments, the computing entity 109 can be cloud-based, or centrally located apart from the one or more robotic devices (including at least one robotic arm 103 and/or at least one mobile robot 105).

For example, in the example as shown in FIG. 1, the computing entity 109 may communicate with the one or more robotic devices (including at least one robotic arm 103 and/or at least one mobile robot 105) through a communication network 107. The communication network 107 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 107 may include an 802.11, 802.16, 802.20, and/or WiMax network. Further, the communication network 107 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the computing entity 109. In some embodiments, the protocol is a custom protocol of JSON objects sent via a Websocket channel. In some embodiments, the protocol is JSON over RPC, JSON over REST/HTTP, and the like.

Referring back to the computing entity 109 as shown in FIG. 1, in some examples, the sorting component 111 may determine a sorting destination associated with each item within the material handling system. The sorting component 111 may receive data from one or more image capturing devices (which may be incorporated into one or more robotic devices including at least one robotic arm 103 and/or at least one mobile robot 105) that may provide imaging data. The imaging data may be based on visual scans or images that the image capturing device captured of the items. In some examples, the sorting component 111 may recognize the items or barcode information on the items based on the imaging data, and may determine the sorting destination accordingly. In other embodiments, the sorting component 111 may be used to facilitate analysis of the scan data to transmit data that may comprise instructions to the one or more robotic devices (including at least one robotic arm 103 and/or at least one mobile robot 105) to facilitate transporting items and/or objects.

In some examples, the routing component 113 of the computing entity 109 may be configured to generate one or more schemes (including sortation scheme, comprehensive sortation scheme, robotic scheme, and/or facility scheme as defined herein), and provide data that may comprise instructions to one or more robotic devices (including at least one robotic arm 103 and/or at least one mobile robot 105) to move items or groups of items within the material handling system based on these schemes, details of which are described in connection with at least FIG. 4 to FIG. 17.

In some examples, the load balancing component 115 of the computing entity 109 may be configured to redirect one or more robotic devices (including at least one robotic arm 103 and/or at least one mobile robot 105) and change the sortation path dynamically based on load, maintenance schedules, and other factors affecting the performance of the one or more robotic devices. In an embodiment, if a particular robotic device is associated with a group of items (for example, based on the type of items, destinations, etc.), and the robotic device is experiencing a higher load than a second robotic device, the load balancing component 115 may cause one or more of the group of items to be redirected to the second robotic device. In some examples, the sorting component 111 may provide data that may comprise instructions to the second robotic device such that the items are sorted into the appropriate sorting destination (e.g. cells, bins, and or put wall stations). In some examples, the routing component 113 may provide data that may comprise instructions to the one or more robotic devices to ensure that the items are directed to the appropriate final destination. Example details of which are described in connection with at least FIG. 4 to FIG. 17.

Figure 2:
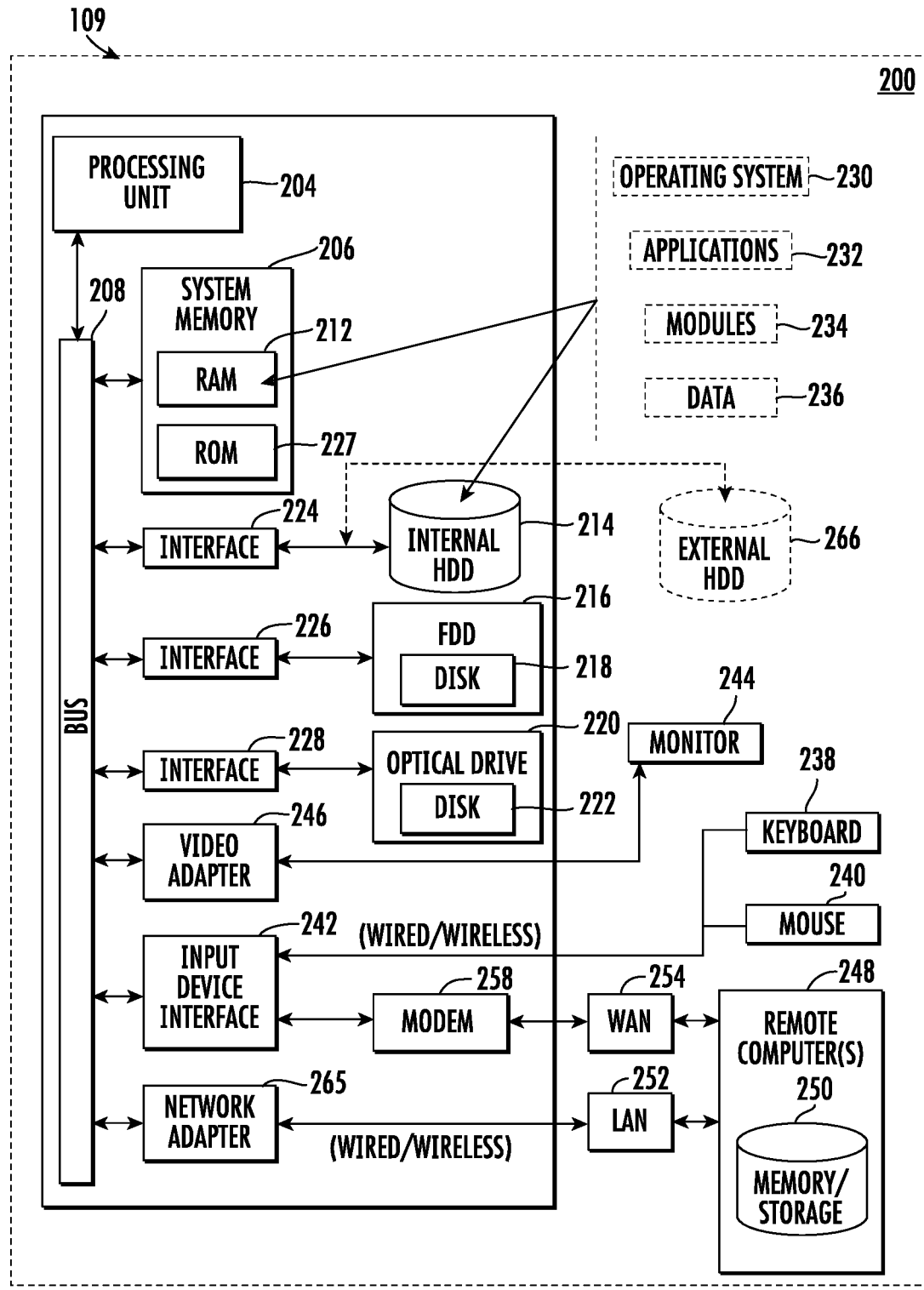
FIG. 2 illustrates an example block diagram of a computing entity that can be operable to execute processes and methods in accordance with various aspects and embodiments of the present disclosure.

The computing entity 109 of FIG. 1 may be embodied by one or more computing systems, such as apparatus 200 shown in FIG. 2. Referring now to FIG. 2, a block diagram of a computing entity 109 is illustrated. The computing entity 109 may be operable to execute the functions and operations performed in the described example embodiments. For example, a computing entity 109 may contain components as described in FIG. 1. The computing entity 109 can provide networking and communication capabilities between a wired or wireless communication network and a server and/or communication device. In order to provide additional context for various aspects thereof, FIG. 2 and the following discussion are intended to provide a brief, general description of a suitable computing environment in which the various aspects of the embodiments can be implemented to facilitate the establishment of a data/information communication/exchange between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules may include routines, programs, components, data structures, etc., that perform particular tasks or implement particular abstract data types. Moreover, examples of the present disclosure may be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Referring back to FIG. 2, the computing entity 109 may include a processing unit 204, a system memory 206 and a system bus 208. The system bus 208 may be coupled with system components including, but not limited to, the system memory 206 to the processing unit 204.

The system memory 206 can be any of various commercially available memories. In the present disclosure, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAIVI), Synchlink DRAM (SLDRAM), and direct Rambus RAM (DRRAIVI). Additionally, the disclosed memory components of systems or methods herein are intended to comprise, without being limited to comprising, these and any other suitable types of memory.

The processing unit 204 can be any of various commercially available processors. Dual microprocessors and other multi-processor architectures can also be employed as the processing unit 204. In the present disclosure, the term "processor," "processing unit," "processing circuitry" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

The system bus 208 can be any of several types of bus structure that can further interconnect to a memory bus (with or without a memory controller), a peripheral bus, and a local bus using any of a variety of commercially available bus architectures. The system memory 206 may include read-only memory (ROM) 227 and random-access memory (RAM) 212. A basic input/output system (BIOS) is stored in a non-volatile memory 227 such as ROM, EPROM, EEPROM, which BIOS contains the basic routines that help to transfer information between elements within the computing entity 109, such as during start-up. The RAM 212 can also include a high-speed RAM such as static RAM for caching data.

The computing entity 109 may further include an internal hard disk drive (HDD) 214 (e.g., EIDE, SATA), which internal hard disk drive 214 can also be configured for external use in a suitable chassis (e.g. external hard disk drive 266), a magnetic floppy disk drive (FDD) 216, (e.g., to read from or write to a removable diskette 218) and an optical disk drive 220, (e.g., reading a CD-ROM disk 222 or to read from or write to other high capacity optical media such as the DVD). The internal hard disk drive 214, magnetic disk drive 216 and optical disk drive 220 can be connected to the system bus 208 by a hard disk drive interface 224, a magnetic disk drive interface 226 and an optical drive interface 228, respectively. The hard disk drive interface 224 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computing entity 109, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computing entity 109, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 212, including an operating system 230, one or more application programs 232, other program modules 234 and program data 236. All or portions of the operating system, applications, modules, and/or data can also be cached in the RAM 212. It is to be appreciated that the various embodiments can be implemented with various commercially available operating systems or combinations of operating systems.

A user can enter commands and information into the computing entity 109 through one or more wired/wireless input devices, e.g., a keyboard 238, a mouse 240. Other input devices (not shown) may include a microphone, an IR remote control, a joystick, a game pad, a stylus pen, touch screen, or the like. These and other input devices are often connected to the processing unit 204 through an input device interface 242 that is coupled to the system bus 208, but can be connected by other interfaces, such as a parallel port, an IEEE 1394 serial port, a game port, a USB port, an IR interface, etc.

A monitor 244 or other type of display device is also connected to the system bus 208 through an interface, such as a video adapter 246. In addition to the monitor 244, a computing entity 109 typically includes other peripheral output devices (not shown), such as speakers, printers, etc.

The computing entity 109 can operate in a networked environment using logical connections by wired and/or wireless communications to one or more remote computers, such as a remote computer(s) 248. The remote computer(s) 248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 250 is illustrated. The logical connections depicted include wired/wireless connectivity to a local area network (LAN) 252 and/or larger networks, e.g., a wide area network (WAN) 254. Such LAN and WAN networking environments are commonplace in offices and companies, and facilitate enterprise-wide computer networks, such as intranets, all of which may connect to a global communications network, e.g., the Internet.

When used in a LAN networking environment, the computing entity 109 is connected to the local network 252 through a wired and/or wireless communication network interface or adapter 265. The adapter 265 may facilitate wired or wireless communication to the LAN 252, which may also include a wireless access point disposed thereon for communicating with the adapter 265.

When used in a WAN networking environment, the computing entity 109 can include a modem 258, or is connected to a communications server on the WAN 254, or has other means for establishing communications over the WAN 254, such as by way of the Internet. The modem 258, which can be internal or external and a wired or wireless device, is connected to the system bus 208 through the input device interface 242. In a networked environment, program modules depicted relative to the computer, or portions thereof, can be stored in the memory/storage device 250 of remote computer(s) 248. It will be appreciated that the network connections shown are exemplary and other means of establishing a communications link between the computers can be used.

The computing entity 109 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices. Wi-Fi, or Wireless Fidelity, uses radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

The computing entity 109 typically comprises a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Figure 3:
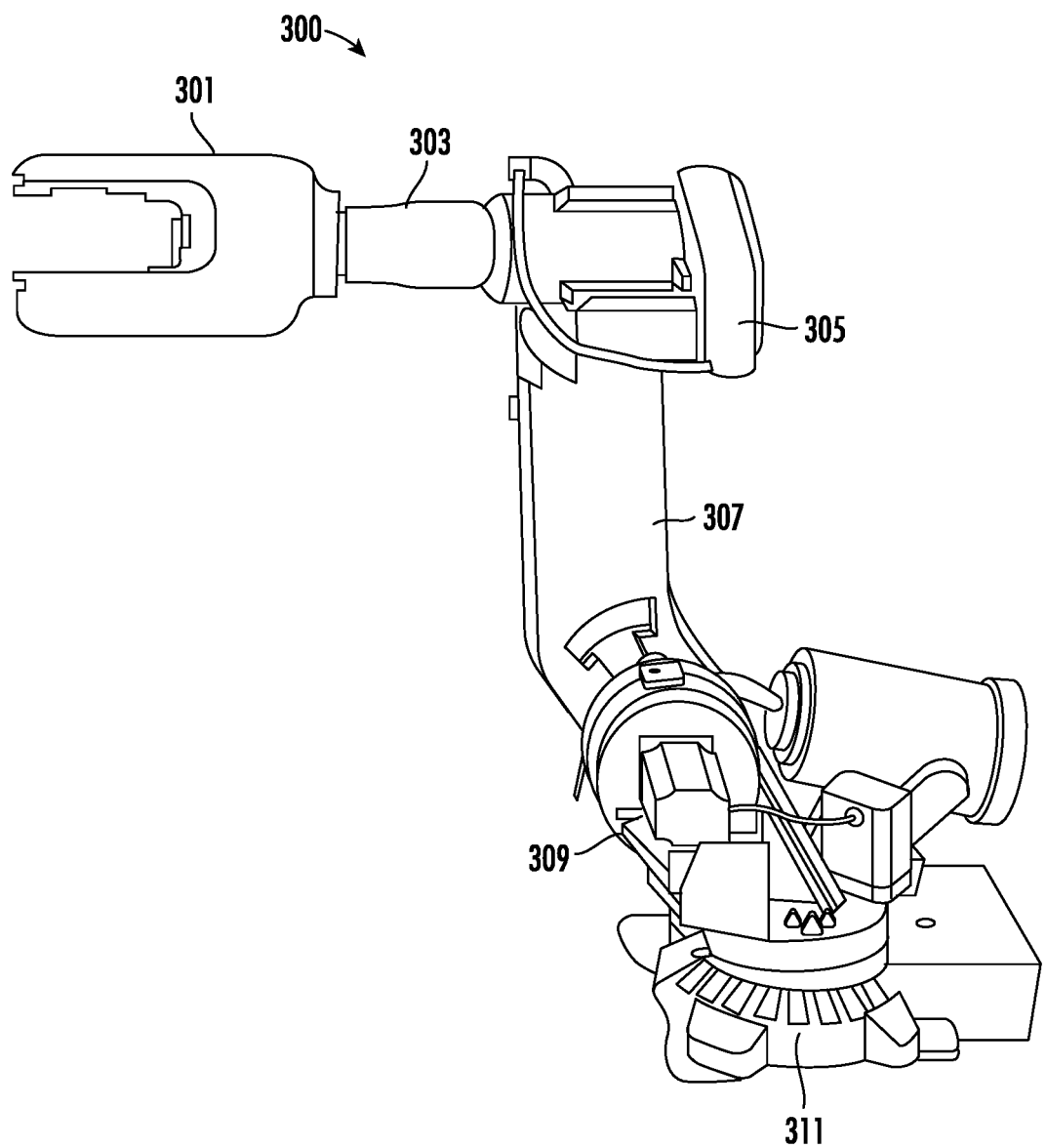
FIG. 3 illustrates an example diagram of an example robotic arm that can be operable to execute processes and methods in accordance with various aspects and embodiments of the present disclosure.

Referring now to FIG. 3, an example diagram illustrating an example robotic arm 300 is provided.

As described above, the robotic arm 300 may refer generally to a mechanical arm that may be programmed and/or controlled by a computing entity (such as the computing entity 109 as shown in FIG. 1). For example, the computing entity 109 may transmit data to the robotic arm 300 to cause the robotic arm 300 to grip, pick up, move, convey, transport, release, place, flip, and/or otherwise manipulate an item of the material handling system based on data received from the computing entity 109.

In some examples, a robotic arm 300 may comprise an end effector 301, which may be attached, fastened, and/or otherwise positioned next to an end of the robotic arm 300. In some examples, the end effector 301 may comprise a gripper mechanism and/or a tool mechanism that may interact with one or more components of the material handling system (including, but not limited to, one or more items and/or articles in the material handling system). Example gripper mechanisms may include, but not limited to, grippers (such as friction gripper, jaw gripper) or mechanical fingers. Example tool mechanisms may include, but not limited to, flippers (which may be configured to flip one or more items). In some examples, the end effector 301 may be associated with a size range that indicates the minimum/maximum dimensions of an item that the robotic arm 300 may interact.

In the example as shown in FIG. 3, the robotic arm 300 may comprise one or more arm segments, such as an arm segment 303 and an arm segment 307. The arm segment 303 and the arm segment 307 may be connected through the joint segment 305, such that the arm segment 303 may pivot around the joint segment 305. In some examples, the joint segment 305 may comprise at least one step motor that enables the arm segment 303 to pivot. Similarly, the arm segment 307 and the base 311 may be connected through the joint segment 309, such that the arm segment 307 may pivot around the joint segment 309 via, for example, a step motor of the joint segment 309.

In some examples, the robotic arm 300 may comprise one or more sensors. For example, a force-torque sensor may be installed on the end effector 301 to detect force and/or torque. Additionally, or alternatively, other sensor(s) may be installed, including, but not limited to, collision sensors.

In some examples, the robotic arm 300 may be securely positioned in the material handling system at a fixed location. For example, the base 311 may be mounted on a fixed location in the material handling system. In some examples, the robotic arm 300 may be moveable. For example, the base 311 may move through a guided rail based on, for example, data received from the computing entity 109. Additionally, or alternatively, the base 311 may be placed on a mobile robot, such that the mobile robot may cause the movement of the robotic arm 300 based on, for example, data received from the computing entity 109.

In some examples, the robotic arm 300 may be associated with an operation range. The term "operation range" refers to one or more locations at which the robotic arm 300 may sort, convey, and/or transport one or more items.

While FIG. 3 illustrates an example robotic arm 300, it is noted that the scope of the present disclosure is not limited to the robotic arm 300 in FIG. 3. In some examples, other forms, types, and/or categories of robotic arms may be implemented in accordance with examples of the present disclosure, including, but not limited to, cylindrical robotic arms.

Figure 4:
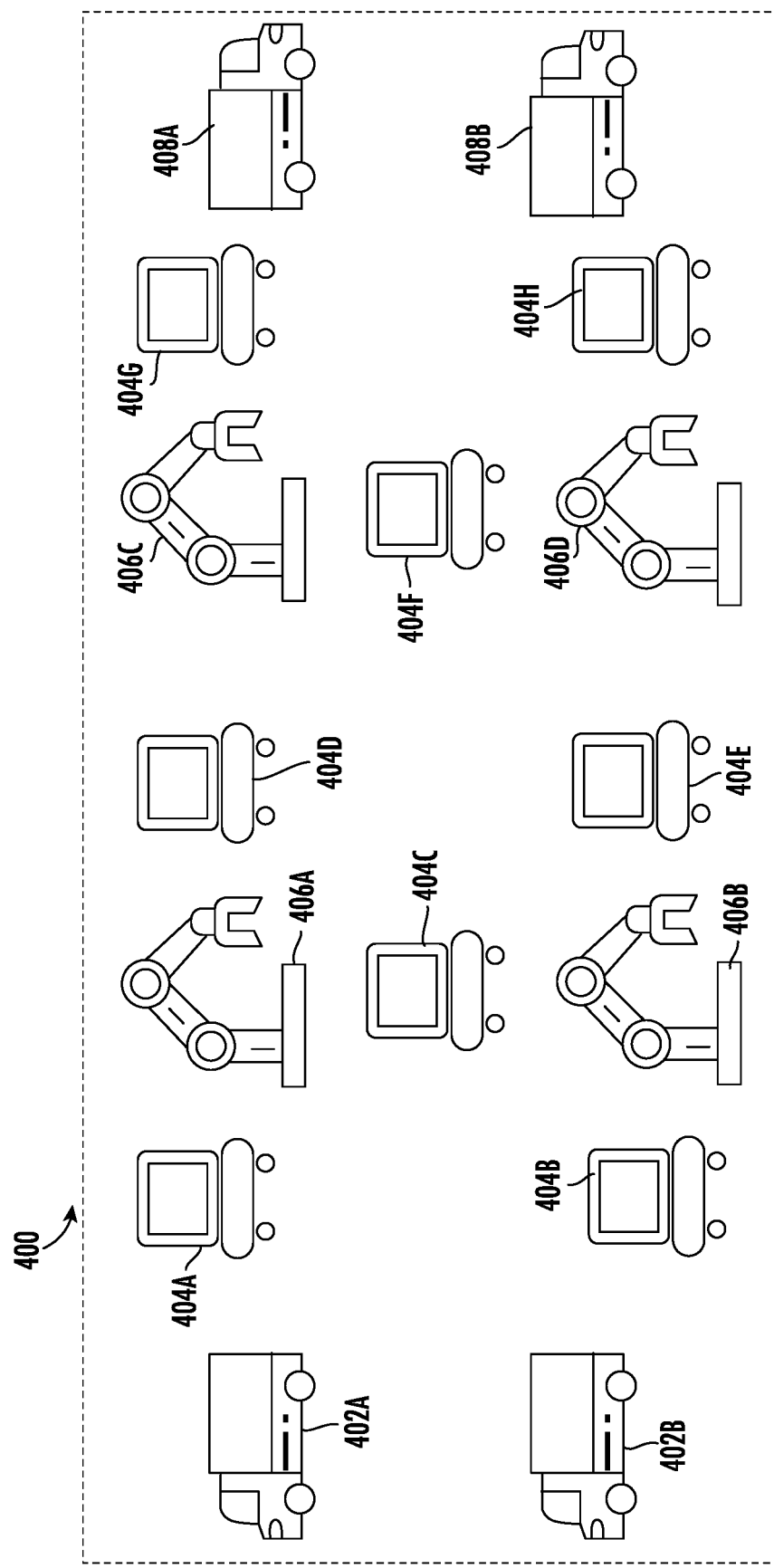
FIG. 4 illustrates an example infrastructure diagram in accordance with various aspects and embodiments of the present disclosure.

Referring now to FIG. 4, an example infrastructure diagram of an example material handling system 400 in accordance with various examples of the present disclosure is illustrated. In the example shown in FIG. 4, the example material handling system 400 may comprise robotic devices including one or more robotic arms (such as robotic arms 406A, 406B, 406C, and 406D) and/or one or more mobile robots (such as mobile robots 404A, 404B, 404C, 404D, 404E, 404F, 404G, and 404H). These one or more robotic arms and/or one or more mobile robots may receive data comprising instructions from a computing entity (such as the computing entity 109 described above in connection with FIG. 1 and FIG. 2), such that they may perform one or more motions, actions, functions and/or operations in accordance with the instructions.

In some examples, one or more of the robotic devices within the material handling system 400 may convey, transport, and/or sort one or more items based on instructions received from the computing entity. For example, the computing entity may transmit instructions to one or more robotic arms (such as robotic arms 406A, 406B, 406C, and 406D) and/or one or more mobile robots (such as mobile robots 404A, 404B, 404C, 404D, 404E, 404F, 404G, and 404H). Based on the instructions, the one or more robotic arms and/or the one or more mobile robots may convey an item from a first sorting location (for example, the sorting location 402A and/or the sorting location 402B) to its corresponding sorting destination (for example, the sorting destination 408A and/or the sorting destination 408B).

As described in detail herein, by utilizing machine vision, artificial intelligence, robust robotic actuation and/or tooling that can handle a wide range of item types and shapes, examples of the present disclosure may reliably and accurately sort items from a bulk infeed to the desired sortation designation. For example, the processing circuitry may analyze items in a bulk infeed, assess the best robotic device(s) to sort/transport the items, generate a sortation scheme for picking and moving those items by the robotic device(s) in an optimal and collision-free sortation path to their final destination, details of which are described herein.

As shown in FIG. 4, examples of the present disclosure may provide various modular components (such as robotic arm(s) and mobile robot(s)), which may provide technical advantages and benefits. For example, these modular components may scale on demand and be redeployed at various parts of the material handling system. Examples of the present disclosure may provide lower investment and operating costs while minimizing downtime risk using dynamic real-time predictive analytics. This modular solution (based on reusable components) may provide a sustainable solution that enables customers to upgrade components of the system over time, without having to replace the entire system at the same time. The system can be integrated into other systems developed by other vendors, allowing the customers to change other components of their solution without having to replace this portion of the system. Example operations in connection with these modular components are described further herein.

Referring now to FIG. 5, FIG. 6, FIG. 7, FIG. 8, FIG. 9, FIG. 10, FIG. 11, FIG. 12, and FIG. 17, example methods in accordance with various embodiments of the present disclosure are illustrated. In some examples, each block or step of the flowchart, and combinations of blocks and steps in the flowchart, may be implemented by various means such as hardware, circuitry and/or other devices associated with execution of software including one or more computer program instructions.

In some examples, one or more of the procedures described in figures may be embodied by computer program instructions, which may be stored by a memory circuitry (such as a non-transitory memory) of an apparatus employing an embodiment of the present disclosure and executed by a processing circuitry (such as a processor) of the apparatus. These computer program instructions may direct the apparatus to function in a particular manner, such that the instructions stored in the memory circuitry produce an article of manufacture, the execution of which implements the function specified in the flowchart block(s). Further, the apparatus may comprise one or more other components, such as, for example, a communication circuitry and/or an input/output circuitry. Various components of the apparatus may be in electronic communication between and/or among each other to transmit data to and/or receive data from each other.

In some examples, embodiments may take the form of a computer program product on a non-transitory computer-readable storage medium storing computer-readable program instructions (e.g. computer software). Any suitable computer-readable storage medium may be utilized including non-transitory hard disks, CD-ROMs, flash memory, optical storage devices, or magnetic storage devices.

Figure 5:
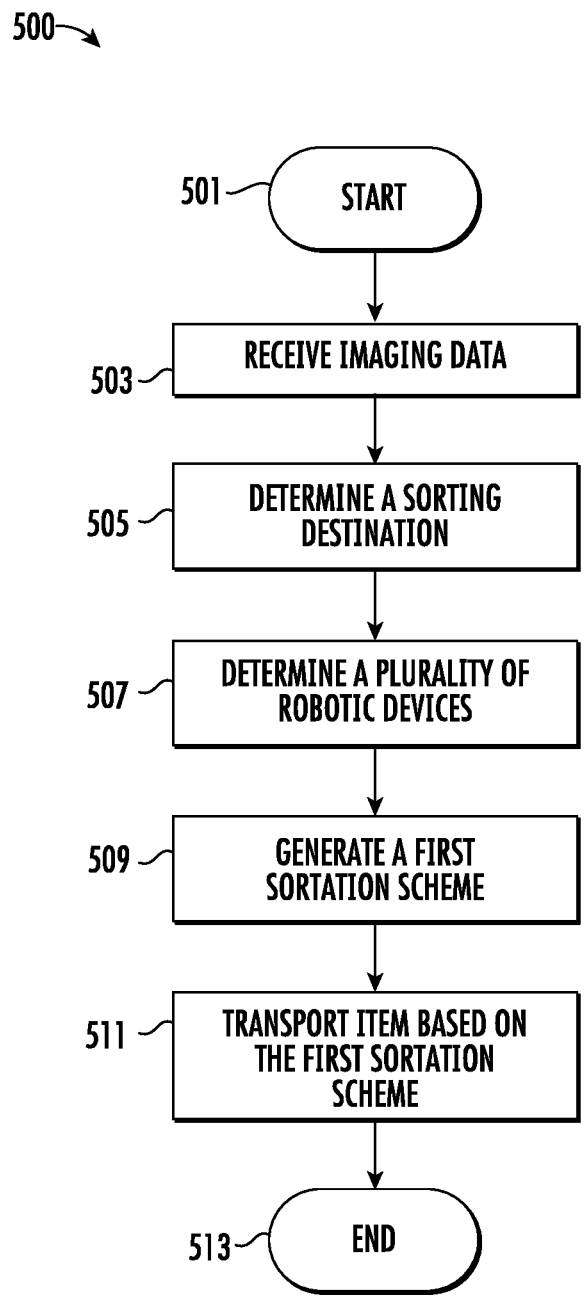
FIG. 5 illustrates an example method in accordance with various aspects and embodiments of the present disclosure.

Referring to FIG. 5, an example method 500 in accordance with some embodiments of the present disclosure is illustrated. In particular, the example method 500 may illustrate example embodiments of generating a sortation scheme. In some examples, the method 500 may be performed by a processing circuitry (such as the processing unit 204 of the computing entity 109 described above in connection with FIG. 1 and FIG. 2).

The method 500 may start at block 501. At block 503, a processing circuitry (such as the processing unit 204 of the computing entity 109 described above in connection with FIG. 1 and FIG. 2) may receive imaging data associated with a first item at a first sorting location of a material handling system.

The term "sorting location" refers to a location in the material handling system where an item may be disposed, positioned or placed so that one or more components of the material handling system may convey, transport, and/or sort the item into another location in the material handling system. Example sorting locations may include, but not limited to, a location on a sorting table, a robotic put wall, a mail sack, a conveyor, a chute, a gaylord, a cart, a pallet. Additionally, or alternatively, example sorting locations may be associated with one or more robotic devices of the material handling system. For example, a sorting location may be within a pre-determined distance from a robotic arm (for example, within the operation range of the robotic arm). As another example, an example sorting location may be a location of an item holding mechanism of a mobile robot (such as an item holding mechanism of an AMR unit or an AGV unit). As another example, an example sorting location may be associated with an unloader of a truck.

In some examples, imaging data associated with the first item at the first sorting location may be captured and/or generated. The term "imaging data" as used herein may correspond to a representation of information/data in the form of plurality of pixels, vectors, and/or other applicable data structure in an image plane that may be either a 2-dimensional plane or a 3-dimensional plane. In some examples, the imaging data may represent information/data of a scene of a sorting location with an item, where each pixel in the plurality of pixels may, for example, represent a point in the scene. Furthermore, each pixel in the plurality of pixels may include associated color information and intensity information. Color information may be represented in the form of one or more color schemes such as, but not limited to, RGB color scheme, CMYK color scheme, monochrome color scheme, grayscale color scheme, and/or the like. In some example embodiments, the imaging data may comprise data representative of a brightness associated with each pixel. In some example embodiments, the pixel may further include depth information that may correspond to a distance of the point in the scene (represented by the pixel) from an image capturing device that captured the image. In an example embodiment, the image may be encoded and represented in one or more formats such as JPEG, Bitmap, PNG, RAW, and/or the like.

In some examples, imaging data may be captured and/or generated by an image capturing device. The term "image capturing device" may correspond to an electronic device that is capable of generating an image based on light signals received from a corresponding field of view of the image capturing device. In some examples, the image capturing device may be configured to generate an image based on reception of light signals in the visible light spectrum. The light signal received by the image capturing device may correspond to a light generated by an illumination source on the image capturing device, may be ambient light, or may be from an external source. In an example embodiment, the image capturing device may further include a lens assembly and a sensor assembly. The lens assembly may include one or more optical components, such as one or more lenses, diffusers, wedges, reflectors or any combination thereof, for directing the light signal on the sensor assembly. In an example embodiment, the sensor assembly includes an image sensor, such as a color or monochrome 1D or 2D CCD, CMOS, NMOS, PMOS, CID or CMD solid state image sensor, that may be configured to generate the image based on the received light signal.

In some examples, the image capturing device may be positioned in the material handling system in such a manner that the field of view of the image capturing device may include at least a scene associated with the first sorting location.

In some examples, one or more image capturing devices may be incorporated into one or more components of the material handling system, including, but not limited to, one or more robotic devices (such as one or more robotic arms or one or more mobile robots). In some examples, the image capturing device may fixedly positioned on a location (for example, ceiling) of the material handling system.

In some examples, the image capturing device may be communicatively coupled with a processing circuitry (such as the processing unit 204 of the computing entity 109 described above in connection with FIG. 1 and FIG. 2), or the like. The processing circuitry may be configured to control the operation of the image capturing device, and/or may receive imaging data from the image capturing device. For example, the computing device may cause the image capturing device to capture the one or more images of a corresponding field of view of the image capturing device, which may be associated with a scene at the first sorting location where a first item is located.

Referring back to FIG. 5, at block 505, a processing circuitry (such as the processing unit 204 of the computing entity 109 described above in connection with FIG. 1 and FIG. 2) may determine a sorting destination for the first item based at least in part on the imaging data.

In some examples, the processing circuitry may determine an item identification associated with the first item based at least in part on the imaging data. The term "item identification" refers to a unique identifier that may be used to identify an item from a plurality of items. In some examples, the processing circuitry may extract an item label associated with the item based on the imaging data, and may determine the item identification based on the item label. Example item label may include, but not limited to, a barcode label (such as a one-dimensional (1D) barcode and/or a two-dimensional (2D) barcode). Based on the item identification, the processing circuitry may retrieve an item profile associated with the item, and may determine a sorting destination for the item based on the item profile. The term "sorting destination" refers to a location within the material handling system that the item should be sorted, delivered, and/or conveyed. Example sorting destinations may include, but not limited to, a location in a gaylord, a cart, a pallet, and/or the like.

Additionally, or alternatively, the processing circuitry may determine one or more characteristics associated with the first item based on the imaging data, and may determine the sorting destination for the first item based on these one or more characteristics. For example, the processing circuitry and/or the image capturing device may incorporate one or more dimensioner apparatuses to determine one or more dimensions of the item. The dimensioner apparatus may, for example, analyze depth information associated with the first item based on the imaging data, and may determine the dimensions of the first item based on the depth information. Based on the dimensions of the first item, the processing circuitry may determine a suitable sorting destination (for example, a pallet having a space where the item would fit).

Additionally, or alternatively, the processing circuitry may implement one or more machine vision and/or computer vision techniques. For example, the processing circuitry may implement an artificial neural network that may extract information from the imaging data based on image/pattern recognition, and may determine an item identification based on the extracted information. Additionally, or alternatively, other artificial intelligence and/or machine learning techniques may be used. Based on the item identification, the processing circuitry may determine a suitable sorting destination, similar to those described above.

At block 507, a processing circuitry (such as the processing unit 204 of the computing entity 109 described above in connection with FIG. 1 and FIG. 2) may determine a plurality of first-tier robotic devices and a plurality of second-tier robotic devices from one or more robotic devices based at least in part on the first sorting location and the sorting destination.

In the present disclosure, a "first-tier" robotic device refers a robotic device that may be configured to sort, convey, and/or transport an item from a first sorting location to a second sorting location associated with a "second-tier" robotic device.

In some examples, the processing circuitry may calculate a relative position relationship between the first sorting location and the sorting destination. In some examples, the processing circuitry may determine the plurality of first-tier robotic devices and the plurality of second-tier robotic devices based at least in part on the relative position relationship and/or the location data associated with robotic devices within the material handling system.

As an example, referring back to FIG. 4, an item may be positioned at the first sorting location 402, and the processing circuitry may determine the corresponding sorting destination 408B for the item. The processing circuitry may determine a relative position relationship that may connect the first sorting location 402 and the sorting destination 408B. For example, the processing circuitry may retrieve (for example, from a data repository that may store location indicators of various sorting locations) a first location indicator indicating a location of the first sorting location 402 and a second location indicator indicating a location of the sorting destination 408B. Based on the first location indicator and the second location indicator, the processing circuitry may determine that the sorting destination 408B is in a first distance and at a first direction from the first sorting location 402A (for example, the sorting destination 408B may be 500 meters to the east of the first sorting location 402A).

In some examples, the relative position relationship may be expressed as the shortest line that may connect the first sorting location 402 and the sorting destination 408B. In some examples, the shortest line may be a straight line connecting the first sorting location 402 and the sorting destination 408B.

In some examples, the relative position relationship may be determined based on layout data associated with the material handling system. For example, the processing circuitry may retrieve layout data associated with the material handling system from a data repository. The layout data may indicate dimensions for the material handling system (for example, length and width of an available workspace for robotic devices). In some examples, the layout data may also indicate one or more obstacle points in the material handling system (for example, an unmovable object such as a structural beam, a wall). In some examples, the shortest line (for the relative position relationship) may be a line that connects the first sorting location 402 and the sorting destination 408B without intersecting with any obstacle points. In other words, the relative position relationship may only be within an available workspace for the robotic devices.

To determine the plurality of first-tier robotic devices and the plurality of second-tier robotic devices, the processing circuitry may retrieve one or more location indicators associated with one or more robotic devices of the material handling system from, for example, a data repository. Continuing from the above example in connection with FIG. 4, the processing circuitry may retrieve location indicators associated with one or more robotic arms (such as robotic arms 406A, 406B, 406C, and 406D) and/or one or more mobile robots (such as mobile robots 404A, 404B, 404C, 404D, 404E, 404F, 404G, and 404H).

In some examples, the processing circuitry may determine robotic devices located within a first pre-determined distance/location from the first sorting location as the first-tier robotic devices. In some examples, the processing circuitry may determine robotic devices that are not first-tier robotic devices, but are located with a second pre-determined distance/location from one of the first-tier robotic devices, as the plurality of second-tier robotic devices.

Additionally, or alternatively, the processing circuitry may determine a plurality of first-tier robotic devices and a plurality of second-tier robotic devices based on their location indicators and the relative position relationship between the first sorting location and the sorting destination. Continuing from the example above, the processing circuitry may determine robotic devices as the first-tier robotic devices if they are (1) located within a first pre-determined distance/location from the first sorting location and (2) located within a second pre-determined distance/location from the shortest line connect the first sorting location 402 and the sorting destination 408B. The processing circuitry may determine robotic devices as the plurality of second-tier robotic devices if they are (1) not determined as a first-tier robotic device, (2) located with a third pre-determined distance/location from a first-tier robotic device, and (3) within a fourth pre-determined distance/location from the shortest line connect the first sorting location 402 and the sorting destination 408B.

While the example above illustrates two tiers of robotic devices, it is noted that the scope of the present disclosure is not limited to only two tiers. Additionally, or alternatively, less than two tiers or more than two tiers of robotic devices may be implemented to sort, convey, and/or transport an item. For example, a second-tier robotic device may sort, convey, and/or transport an item from the second sorting location to a third sorting location associated with a "third-tier" robotic device. Additionally, or alternatively, the processing circuitry may determine only one tier of robotic devices to sort, convey, and/or transport the item from the first sorting location to the sorting destination.

At block 509, a processing circuitry (such as the processing unit 204 of the computing entity 109 described above in connection with FIG. 1 and FIG. 2) may generate a first sortation scheme for the first item.

The term "sortation scheme" refers to computer software programming instructions that, when transmitted to and executed by one or more robotic devices, may cause the one or more robotic devices to sort, convey, and/or transport an item from a sorting location to a sorting destination via a sortation path. In some examples, the sortation path indicated by the sortation scheme is associated with at least one of the plurality of first-tier robotic devices and at least one of the plurality of second-tier robotic devices of the material handling system. For example, the first sortation scheme may comprise one or more robotic device identifiers associated with the robotic devices. In some examples, the plurality of second-tier robotic devices may be downstream of the plurality of first-tier robotic devices in the first sortation path.

The term "comprehensive sortation scheme" refers to a collective scheme that may encompass all items to be sorted, conveyed, and/or transported within the material handling system. For example, the processing circuitry may generate a first sortation scheme for the first item, a second sortation scheme for the second item, and/or the like. The collection of sortation schemes (e.g. the first sortation scheme, the second sortation scheme, . . . ) may be referred to as a "comprehensive sortation scheme."

In some examples, the processing circuitry may select a first-tier robotic device from the plurality of the first-tier robotic devices, and may select a second-tier robotic device from the plurality of second-tier robotic devices. Example details of which are described in connection with at least FIG. 6, FIG. 7, FIG. 8, FIG. 9, FIG. 10, FIG. 11, and FIG. 12. The sortation scheme may indicate robotic device identifiers associated with these selected robotic devices.

At block 511, a processing circuitry (such as the processing unit 204 of the computing entity 109 described above in connection with FIG. 1 and FIG. 2) may cause one or more of the robotic devices to transport the first item.

In some examples, the processing circuitry may cause the at least one of the plurality of first-tier robotic devices and the at least one of the plurality of second-tier robotic devices to transport the first item based at least in part on the first sortation scheme.

As an example, referring back to FIG. 4, the sortation scheme may indicate a sortation path to convey the first item from the first sorting location 402A to the sorting destination 408B that may be associated with the robotic arm 406A, the mobile robot 404D, the robotic arm 406C and the mobile robot 404H. In this example, the processing circuitry may transmit data comprising instructions to these robotic devices, causing the robotic arm 406A to sort, convey, and/or transport the first item to the mobile robot 404D, and subsequently, causing the mobile robot 404D to sort, convey, and/or transport the first item to the robotic arm 406C, and subsequently, causing the robotic arm 406C to sort, convey, and/or transport the first item to the mobile robot 404H, and subsequently, causing the mobile robot 404H to sort, convey, and/or transport the first item to the sorting destination 408B.

The example method 500 may end at block 513.

In some examples, the method 500 may be repeated on each item in the material handling system until all items are sorted, conveyed, and/or transported to their corresponding sorting destinations. In some examples, if a sorting destination no longer has the capacity to receive any additional item, the processing circuitry may disable the corresponding sorting destination and preventing any robotic device from sorting items to that destination. The processing circuitry may further determine another sorting destination for the item, similar to those descried above in connection with block 505 of FIG. 5.

Figure 6:
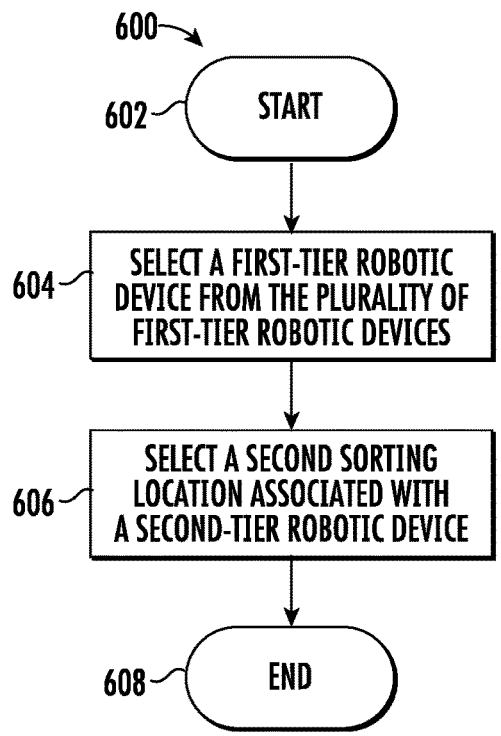
FIG. 6 illustrates an example method in accordance with various aspects and embodiments of the present disclosure.

Referring now to FIG. 6, an example method 600 in accordance with some embodiments of the present disclosure is illustrated. In particular, the example method 600 may illustrate example embodiments of selecting a first-tier robotic device and a second-tier robotic device. In some examples, the method 600 may be performed by a processing circuitry (such as the processing unit 204 of the computing entity 109 described above in connection with FIG. 1 and FIG. 2).

The method 600 may start at block 602. At block 604, a processing circuitry (such as the processing unit 204 of the computing entity 109 described above in connection with FIG. 1 and FIG. 2) may select a first-tier robotic device from the plurality of first-tier robotic devices.

In some examples, the processing circuitry may select the first-tier robotic device from the plurality of first-tier robotic devices based on a processing time associated with the each of the first-tier robotic devices. For example, the processing circuitry may calculate the processing time based on load indicators associated with the first-tier robotic devices, example details of which are described in connection with at least FIG. 7.

In some examples, the processing circuitry may select the first-tier robotic device from the plurality of first-tier robotic devices based on a maintenance schedule associated with the each of the first-tier robotic devices. For example, the processing circuitry may determine maintenance schedules based on schedule indicators associated with the first-tier robotic devices, example details of which are described in connection with at least FIG. 8.

In some examples, the processing circuitry may select the first-tier robotic device from the plurality of first-tier robotic devices based on dimensions of the item(s) to be sorted, conveyed, and/or transported. As described above, the processing circuitry and/or the image capturing device may incorporate one or more dimensioner apparatus to determine one or more dimensions of the item(s). The processing circuitry may select a robotic device that may have the corresponding capability to sort, convey, and/or transport the item(s). For example, the processing circuitry may select a robotic arm with an end effector that may have the capability to sort, convey, and/or transport the item given the item's dimensions and the size range of the end effector. Additionally, or alternatively, the processing circuitry may select a mobile robot having an item holding mechanism with space that would accommodate the item's dimensions.

In some examples, the processing circuitry may select the first-tier robotic device based on a combination of factors. For example, the processing circuitry may select the first-tier robotic device based on the processing time of the robotic device, the maintenance schedule of the robotic device, and/or the dimensions of the item. Additionally, or alternatively, the processing circuitry may select the first-tier robotic device based on other factors.

At block 606, a processing circuitry (such as the processing unit 204 of the computing entity 109 described above in connection with FIG. 1 and FIG. 2) may select a second sorting location associated with a second-tier robotic device of the plurality of second-tier robotic devices.

In some examples, the processing circuitry may select a second-tier robotic device from the plurality of second-tier robotic devices, similar to selecting the first-tier robotic device described above in connection with block 604 of FIG. 6 and will be described in connection with at least FIG. 9. Subsequent to selecting the second-tier robotic device, the processing circuitry may select a second sorting location based on the selected second-tier robotic device. In some examples, the second-tier robotic device may be a robotic arm, and the second sorting location may be a location within the operation range of the robotic arm. In some examples, the second-tier robotic device may be a mobile robot, and the second sorting location may be within a travel range of the mobile robot.

The method 600 may end at block 608.

While the above description provides selecting a robotic device, it is noted the examples of the present disclosure may include the processing circuitry selecting one or more specific types of robotic devices. For example, the processing circuitry may select a first robotic arm and a second robotic arm based at least in part on the first sorting location and the sorting destination, similar to those described above in connection with FIG. 6. Additionally, or alternatively, the processing circuitry may cause the first robotic arm to transport the item to at least one of a first AMR unit or a first AGV unit, and cause the at least one of the first AMR unit or the first AGV unit to transport the item to a second sorting location associated with the second robotic arm. Additionally, or alternatively, the second sorting location may be a sorting table. Additionally, or alternatively, the second sorting location may be a cell of a robotic put wall. Additionally, or alternatively, the processing circuitry may cause the second robotic arm to transport the item from the second sorting location to the at least one of the first AMR unit or the first AGV unit. Additionally, or alternatively, the processing circuitry may cause the at least one of the first AMR unit (or another AMR unit) or the first AGV unit (or another AGV unit) to transport the item to a third sorting location. Additionally, or alternatively, the third sorting location may be a mail sack mounted on a cart. Additionally, or alternatively, the processing circuitry may cause the at least one of the first AMR unit or the first AGV unit to transport the cart to the sorting destination. Additionally, or alternatively, the processing circuitry may cause a sorting device to seal the mail sack, and may cause the sorting device to sort the mail sack to the sorting destination.

Figure 7:
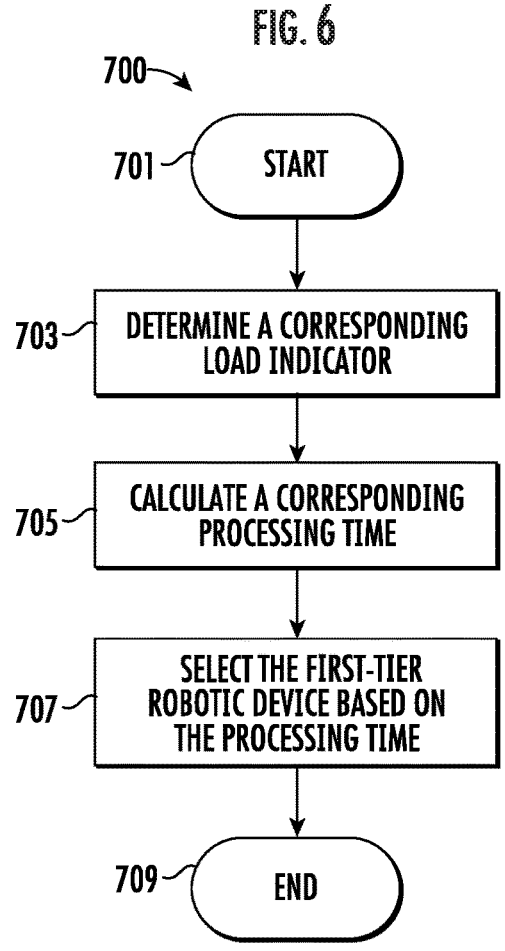
FIG. 7 illustrates an example method in accordance with various aspects and embodiments of the present disclosure.

Referring now to FIG. 7, an example method 700 in accordance with some embodiments of the present disclosure is illustrated. In particular, the example method 700 may illustrate example embodiments of selecting a first-tier robotic device based at least in part on a load indicator. In some examples, the method 700 may be performed by a processing circuitry (such as the processing unit 204 of the computing entity 109 described above in connection with FIG. 1 and FIG. 2).

The method 700 may start at block 701. At block 703, a processing circuitry (such as the processing unit 204 of the computing entity 109 described above in connection with FIG. 1 and FIG. 2) may determine a corresponding load indicator associated with each of the plurality of first-tier robotic devices. In some examples, the corresponding load indicator may indicate a number of items that are assigned to each of the plurality of first-tier robotic devices for sorting, conveying, and/or transporting.

In some examples, the processing circuitry may track and/or monitor the number of items to be sorted, conveyed, and/or transported from one sorting location to another sorting location. In some examples, the number of items may be determined based on imaging data captured by an image capturing device. For example, these items may be placed on a sorting table within the operation range of the robotic arm, and an image capturing device may capture and/or generate imaging data representing a scene of the sorting table. The processing circuitry may receive the imaging data from the image capturing device, and may analyze the image data to determine the number of items that are yet to be sorted, conveyed, and/or transported (for example, by implementing one or more machine vision and/or computer vision techniques described above). In some examples, the image capturing device may capture/generate imaging data at a pre-determined time interval, such that an accurate number of items may be determined.

Additionally, or alternatively, the processing circuitry may track and/or monitor the number of items based on data received from one or more sensors. Continuing from the above sorting table example, one or more weight sensors may be integrated into the sorting table to detect weight data associated with the items on the sorting table, and the processing circuitry may determine the number of items based on the weight data and weight information associated with each item (for example, based on item profile).

Additionally, or alternatively, other software and/or hardware techniques may be used to track and/or monitor the number of items, and/or to determine the load indicator, without deviating from the scope of the present disclosure.

At block 705, a processing circuitry (such as the processing unit 204 of the computing entity 109 described above in connection with FIG. 1 and FIG. 2) may calculate a corresponding processing time of each of the plurality of first-tier robotic devices based at least in part on the corresponding load indicator.

In some examples, the processing circuitry may calculate the processing time based on the number of items that are assigned to each robotic device and the average processing time per item of the robotic device. For example, the processing circuitry may multiple the number of items with the average processing time per item to determine the processing time for the robotic device.

Additionally, or alternatively, the processing circuitry may implement one or more predictive modeling algorithms to generate an estimated processing time. For example, the processing circuitry may track historical processing time associated with each robotic device, and provide historical processing time as input to the predictive modeling algorithms to generate estimated processing time. Example predictive modeling algorithms may include, but not limited to, linear regression models, logistic regression models, neural networks, Naive Bayes, and/or the like.

Additionally, or alternatively, other techniques may be used to determine the corresponding processing time associated with each of the plurality of first-tier robotic devices based at least in part on the corresponding load indicator.

At block 707, a processing circuitry (such as the processing unit 204 of the computing entity 109 described above in connection with FIG. 1 and FIG. 2) may select the first-tier robotic device based on the processing time. For example, the processing circuitry may select the first-tier robotic device having the shortest processing time as the first-tier robotic device for the sortation scheme.

The method 700 may end at block 709.

Figure 8:
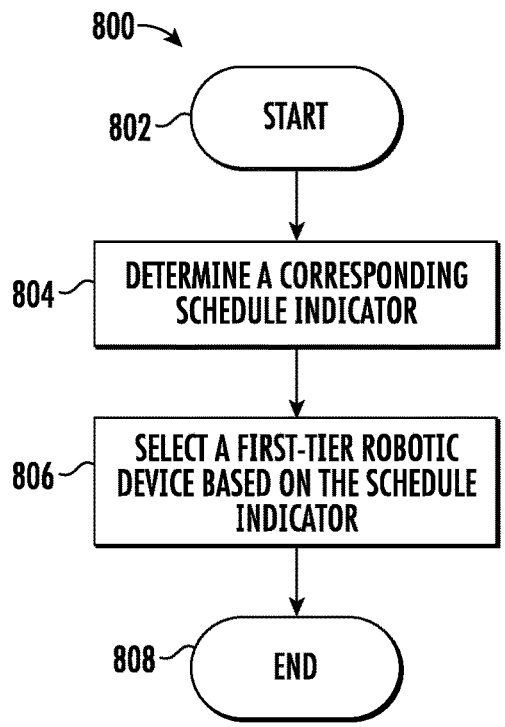
FIG. 8 illustrates an example method in accordance with various aspects and embodiments of the present disclosure.

Referring now to FIG. 8, an example method 800 in accordance with some embodiments of the present disclosure is illustrated. In particular, the example method 800 may illustrate selecting a first-tier robotic device based at least in part on a schedule indicator. In some examples, the method 800 may be performed by a processing circuitry (such as the processing unit 204 of the computing entity 109 described above in connection with FIG. 1 and FIG. 2).

The method 800 may start at block 802. At block 804, a processing circuitry (such as the processing unit 204 of the computing entity 109 described above in connection with FIG. 1 and FIG. 2) may determine a corresponding schedule indicator associated with each of the plurality of first-tier robotic devices.

In some examples, the schedule indicator may indicate a maintenance schedule associated with each robotic device. The maintenance schedule may indicate the time and date when a robotic device is scheduled to be in maintenance. When the maintenance schedule indicates that a robotic device is in maintenance, the robotic device may be offline and may not sort, convey, and/or transport any item.

In some examples, the processing circuitry may retrieve the schedule indicator from a data repository associated with the material handling system. For example, a user may provide inputs to the data repository that may indicate maintenance schedules associated with the robotic devices, and the processing circuitry may determine the schedule indicators for the robotic devices based on user inputs stored in the data repository.

In some examples, the processing circuitry may determine a schedule indicator based on one or more predictive modeling algorithms. For example, the processing circuitry may track historical maintenance times and dates associated with each robotic device, and provide historical maintenance times and dates as input to the predictive modeling algorithms to generate estimated maintenance times and dates. Example predictive modeling algorithms may include, but not limited to, linear regression models, logistic regression models, neural networks, Naive Bayes, and/or the like.

At block 806, a processing circuitry (such as the processing unit 204 of the computing entity 109 described above in connection with FIG. 1 and FIG. 2) may select a first-tier robotic device based on the schedule indicator.

In some examples, the processing circuitry may determine a current time and date (for example, based on a system time/date), and may compare the current time and date to the maintenance times and dates as indicated by the scheduled indicator. If the current time and date is within a predetermined time range from a maintenance time and date of a robotic device, the processing circuitry may forge selecting the corresponding robotic device as the first-tier robotic device.

In some examples, the processing circuitry may determine an estimated time and date that a robotic device may sort, convey, and/or transport an item (for example, based on the processing time as described above in connection with FIG. 7), and may determine whether the estimated time and date is within a predetermined time range from a maintenance time and date of a robotic device. If so, the processing circuitry may forge selecting the corresponding robotic device as the first-tier robotic device for the item.

The method 800 may end at block 808.

Figure 9:
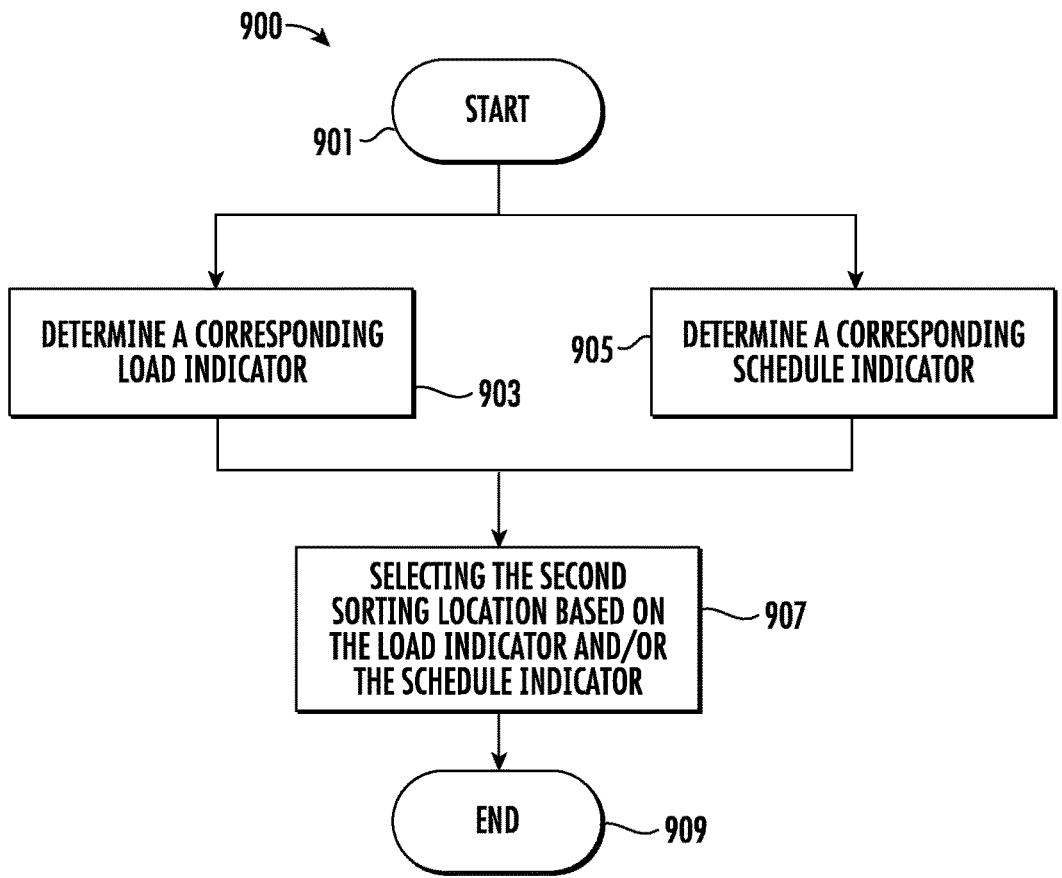
FIG. 9 illustrates an example method in accordance with various aspects and embodiments of the present disclosure.

Referring now to FIG. 9, an example method 900 in accordance with some embodiments of the present disclosure is illustrated. In particular, the example method 900 may illustrate example embodiments of selecting the second sorting location and/or the second-tier robotic device. In some examples, the method 900 may be performed by a processing circuitry (such as the processing unit 204 of the computing entity 109 described above in connection with FIG. 1 and FIG. 2).

The method 900 may start at block 901. At block 903, a processing circuitry (such as the processing unit 204 of the computing entity 109 described above in connection with FIG. 1 and FIG. 2) may determine a corresponding load indicator associated with each of the plurality of second-tier robotic devices.

In some examples, the processing circuitry may determine the load indicator for each of the plurality of second-tier robotic devices in a manner similar to determining the load indicator for each of the plurality of first-tier robotic devices as described above in connection with FIG. 7.

At block 905, a processing circuitry (such as the processing unit 204 of the computing entity 109 described above in connection with FIG. 1 and FIG. 2) may determine a corresponding schedule indicator associated with each of the plurality of second-tier robotic devices.

In some examples, the processing circuitry may determine the schedule indicator for each of the plurality of second-tier robotic devices in a manner similar to determining the schedule indicator for each of the plurality of first-tier robotic devices as described above in connection with FIG. 8.

At block 907, a processing circuitry (such as the processing unit 204 of the computing entity 109 described above in connection with FIG. 1 and FIG. 2) may select the second sorting location based at least in part on the load indicator and/or the schedule indicator for each of the plurality of second-tier robotic devices, similar to those described above in connection with FIG. 7 and FIG. 8.

For example, the processing circuitry may select a second-tier robotic device that is not scheduled for maintenance (for example, based on the schedule indicator determined at block 905) and has the shortest processing time (for example, based on the load indicator determined at block 903). Subsequently to selecting the second-tier robotic device, the processing circuitry may select the second sorting location based on the selected second-tier robotic device, similar to those described above in connection with block 606 of FIG. 6.

The method 900 may end at block 909.

Figure 10:
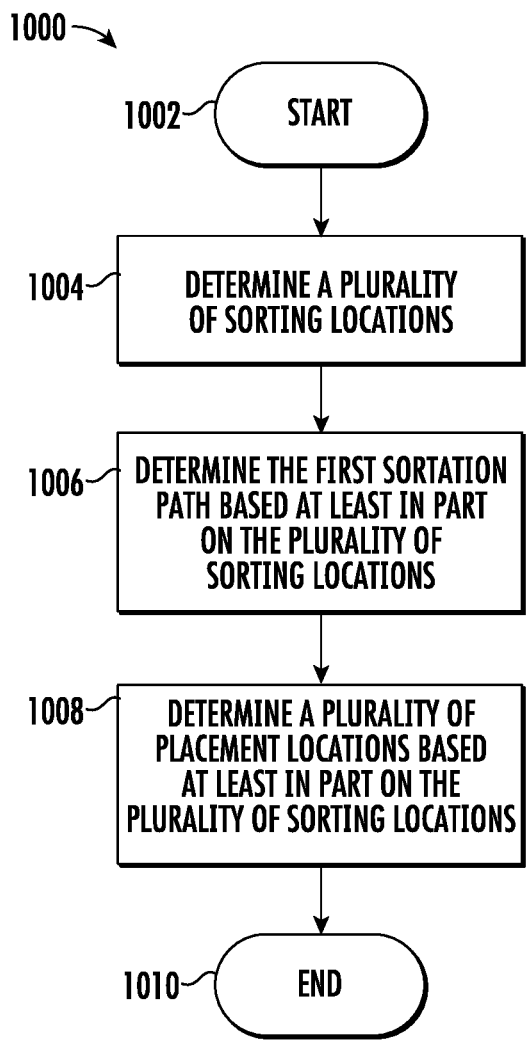
FIG. 10 illustrates an example method in accordance with various aspects and embodiments of the present disclosure.

Referring now to FIG. 10, an example method 1000 in accordance with some embodiments of the present disclosure is illustrated. In particular, the example method 1000 may illustrate example embodiments of dynamically placing/positioning robotic devices for sorting, conveying, and/or transporting one or more items. In some examples, the method 1000 may be performed by a processing circuitry (such as the processing unit 204 of the computing entity 109 described above in connection with FIG. 1 and FIG. 2).

In some examples, the processing circuitry may generate one or more robotic schemes and a facility scheme. The term "robotic scheme" refers to computer software programming instructions that, when transmitted to and executed by one or more robotic devices, may cause the one or more robotic devices to be moved, placed, and/or positioned to a corresponding placement location, details of which are described at least in connection with FIG. 10. The term "facility scheme" refers to a collective scheme that may encompass placement locations associated with all robotic devices within the material handling system. For example, the processing circuitry may generate a first robotic scheme for the first robotic device, a second robotic scheme for the second robotic device, and/or the like. The collection of robotic schemes (e.g. the first robotic scheme, the second robotic scheme, . . . ) may be referred to as a "facility scheme."

The method 1000 may start at block 1002. At block 1004, a processing circuitry (such as the processing unit 204 of the computing entity 109 described above in connection with FIG. 1 and FIG. 2) may determine a plurality of sorting locations based at least in part on the first sorting location and the sorting destination.

As described above in connection with FIG. 5, the processing circuitry may determine a relative position relationship that may connect the first sorting location (i.e. the starting location of an item) and the sorting destination. In some examples, the relative position relationship may correspond to a shortest line connecting the first sorting location and the sorting destination, as described above. As described above in connection with FIG. 5, the relative position relationship may be determined based on the layout data associated with the material handling system.

In some examples, the material handling system may receive a plurality of items to be sorted, conveyed, and/or transported from one or more sorting locations to one or more sorting destinations. In such examples, the processing circuitry may determine a relative position relationship connecting each of the corresponding sorting location and the corresponding sorting destination of each of the items. In some examples, each relative position relationship may correspond to a shortest line connecting each sorting location and each sorting destination. In some examples, the processing circuitry may determine one or more intersection points between these shortest lines (corresponding to relative position relationships) associated with the first sorting locations and the sorting destinations of the plurality of items.

In some examples, the processing circuitry may determine the plurality of sorting locations based on these intersection points. For example, the processing circuitry may set a sorting location for each intersection point. In such examples, by setting sorting locations using interaction points of shortest lines, the processing circuitry may identify one or more existing locations or placement locations for one or more robotic devices, such that they may be strategically placed/positioned to sort, convey, and/or transport the plurality of items in the quickest manner, as described further below.

At block 1006, a processing circuitry (such as the processing unit 204 of the computing entity 109 described above in connection with FIG. 1 and FIG. 2) may determine a first sortation path based at least in part on the plurality of sorting locations. In some examples, the first sortation path may connect one or more of the sorting locations determined at block 1006.

In some examples, the processing circuitry may further optimize the first sortation path. For example, as will be described below in connection with at least block 1008, one or more robotic devices may execute the first sortation path. In this regard, the processing circuitry may adjust the first sortation path based on the starting/initiation time associated with these robotic devices, such that only a shortest amount of time is required for these robotic devices to be turned on and/or to sort/convey/transport one or more items based on the sortation path. Additionally, or alternatively, the processing circuitry may optimize the first sortation path based on the sortation destination. For example, the processing circuitry may adjust the first sortation path and cause the robotic devices to sort, convey, and/or transport all items for a particular sortation destination in the shortest amount of time, therefore allowing these items to be, for example, transported from the material handling system in the shortest amount of time. Additionally, or alternatively, the processing circuitry may optimize the first sortation path based on the item(s). For example, the processing circuitry may adjust the first sortation path and cause the robotic devices to sort, convey, and/or transport one or more particular items in a shortest amount of time.

At block 1008, a processing circuitry (such as the processing unit 204 of the computing entity 109 described above in connection with FIG. 1 and FIG. 2) may determine a plurality of placement locations for the one or more robotic devices to execute the first sortation path.

For example, each of the placement locations for the one or more robotic devices may correspond to each of the sorting locations determined at block 1004, such that these one or more robotic devices may execute the first sortation path determined at block 1006 to sort, convey, and/or transport the item to the sorting destination.

In some examples, the placement locations may be determined based at least in part on the layout data associated with the material handling system. For example, the processing circuitry may remove any placement location that may intersect and/or overlap with any obstacle point as indicated by the layout data. Additionally, or alternatively, the processing circuitry may determine the placement locations based on the confinement of the material handling system (for example, based on the dimensions of the material handling system as indicated in the layout data).

In some examples, the placement locations may be determined based at least in part on the size data associated with each robotic device and the layout data associated with the material handling system. For example, the processing circuitry may select one or more placement locations based on determining that these placement locations enable the robotic devices to operate (for example, based on the size data) within the confinement of the material handling system (for example, based on the layout data).

In some examples, the processing circuitry may generate a robotic scheme for each robotic device within the material handling system, and may transmit the robotic scheme to the corresponding robotic device, causing the one or more robotic devices to be moved, placed, and/or positioned to the placement locations determined at block 1008, and subsequently, may cause these robotic devices to sort, convey, and/or transport these items to their corresponding sorting destinations. In some examples, the processing circuitry may generate a facility scheme for all robotic devices within the material handling system.

As an example, the processing circuitry may transmit data comprising a robotic scheme to a mobile robot. The robotic scheme may comprise a location indicator associated with the placement location. As described above, the mobile robot may implement one or more positioning technologies to interpret location data to identify a destination location within the material handling system corresponding to the placement location. Based on these positioning technologies, the microcontroller of the mobile robot may calculate a travel path from a current location of the mobile robot to the destination location, and may further activate the steering mechanisms of the mobile robot to direct and cause the mobile robot to travel to the destination location.

The method 1000 may end at block 1010.

Figure 11:
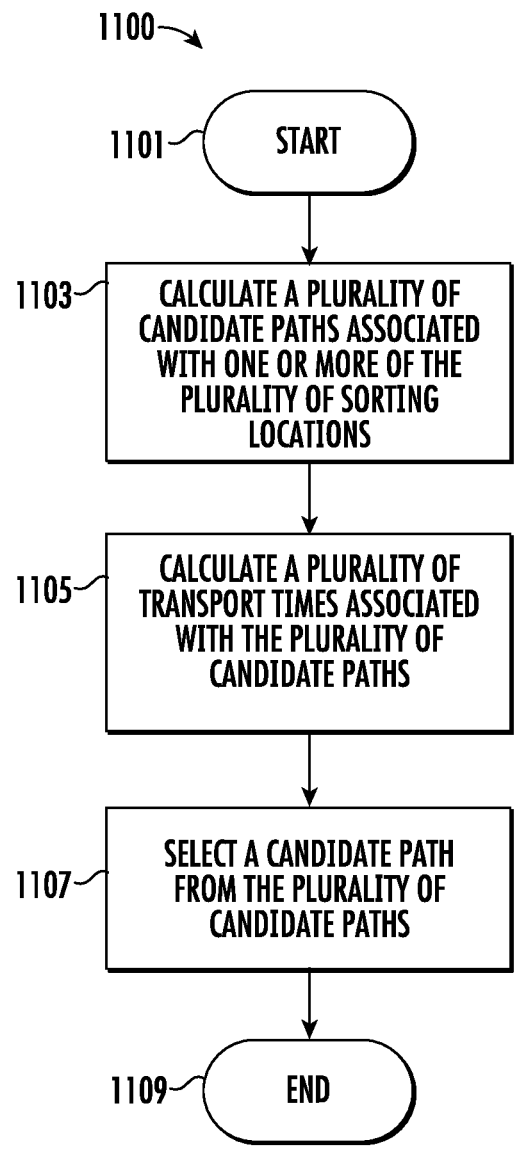
FIG. 11 illustrates an example method in accordance with various aspects and embodiments of the present disclosure.

Referring now to FIG. 11, an example method 1100 in accordance with some embodiments of the present disclosure is illustrated. In particular, the example method 1100 may illustrate example embodiments of calculating a plurality of sorting paths and selecting a best path for sorting, conveying, and/or transporting an item. In some examples, the method 1100 may be performed by a processing circuitry (such as the processing unit 204 of the computing entity 109 described above in connection with FIG. 1 and FIG. 2).

The method 1100 may start at block 1101. At block 1103, a processing circuitry (such as the processing unit 204 of the computing entity 109 described above in connection with FIG. 1 and FIG. 2) may calculate a plurality of candidate paths associated with one or more of the plurality of sorting locations.

In some examples, the one or more of the plurality of sorting locations may be determined, for example, in accordance with block 1004 of FIG. 10 as described above. In some examples, each of the plurality of candidate paths may connect one or more of the plurality of sorting locations. In some examples, each of the plurality of candidate paths may be associated with at least one robotic device of the one or more robotic devices. For example, as described above in connection with block 1008 of FIG. 10, the processing circuitry may determine a plurality of placement locations for the one or more robotic devices, and may cause the one or more robotic devices to be moved, placed or positioned in their corresponding placement locations.

At block 1105, a processing circuitry (such as the processing unit 204 of the computing entity 109 described above in connection with FIG. 1 and FIG. 2) may calculate a plurality of transport times associated with the plurality of candidate paths.

In some examples, the processing circuitry may calculate the plurality of transport times based at least in part on the processing times associated with each of the robotic devices. For example, the processing circuitry may determine a processing time for each robotic device assigned to the candidate path, similar to those above in connection with FIG. 7. The processing circuitry may add up the processing times for these robotic devices to determine the transport time for the corresponding candidate path.

At block 1107, a processing circuitry (such as the processing unit 204 of the computing entity 109 described above in connection with FIG. 1 and FIG. 2) may select a candidate path, from the plurality of candidate paths, that is associated with a least transport time among the plurality of transport times.

In some examples, subsequent to or when selecting the candidate path, the processing circuitry may cause the one or more robotic devices associated with the selected candidate path to sort, convey, and/or transport the one or more items to their corresponding sorting destinations.

The method 1100 may end at block 1109.

Figure 12:
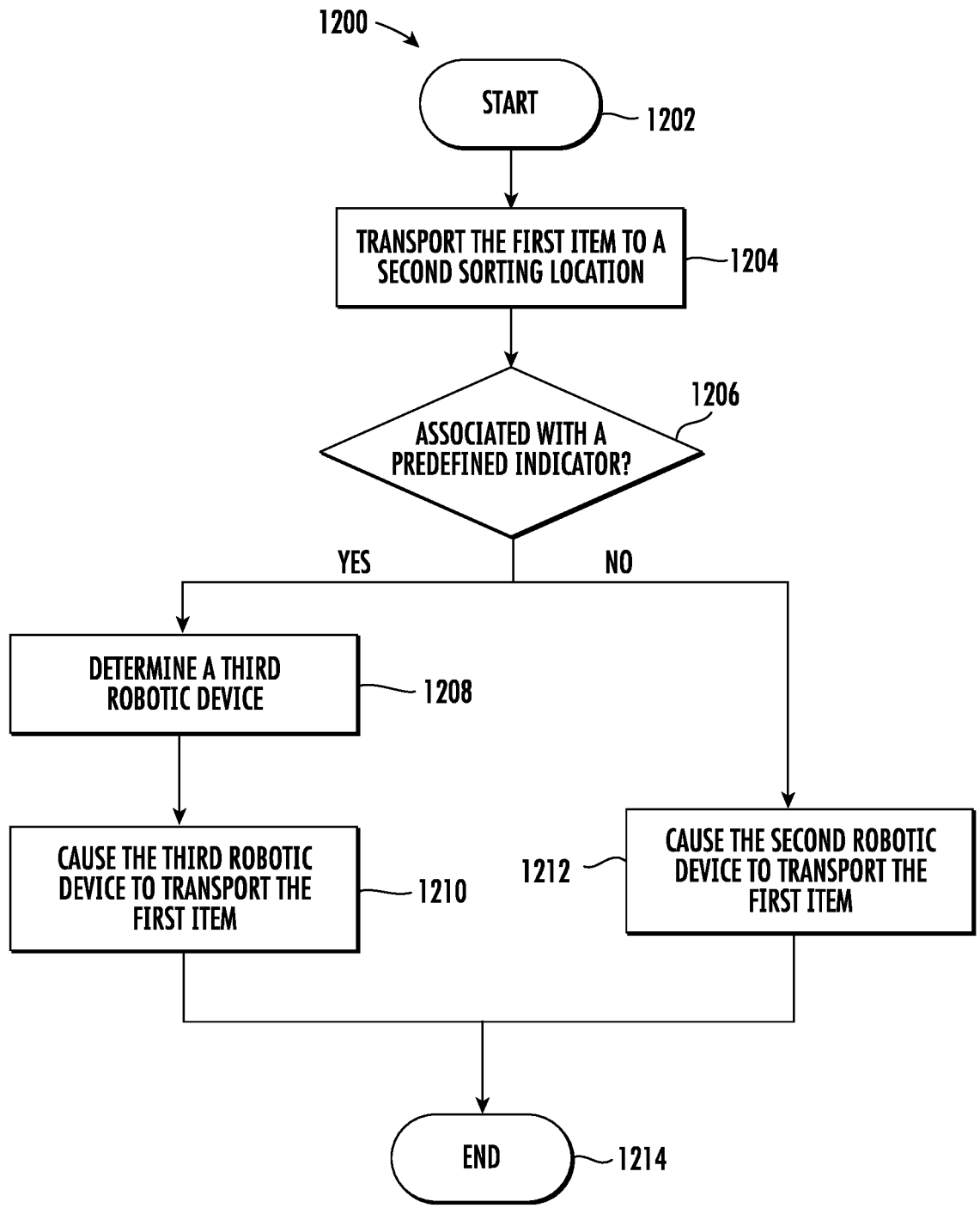
FIG. 12 illustrates an example method in accordance with various aspects and embodiments of the present disclosure.

Referring now to FIG. 12, an example method 1200 in accordance with some embodiments of the present disclosure is illustrated. In particular, the example method 1200 may illustrate example embodiments of dynamically reconfiguring a sortation path. In some examples, the method 1200 may be performed by a processing circuitry (such as the processing unit 204 of the computing entity 109 described above in connection with FIG. 1 and FIG. 2).

The method 1200 may start at block 1202. At block 1204, a processing circuitry (such as the processing unit 204 of the computing entity 109 described above in connection with FIG. 1 and FIG. 2) may cause a first robotic device to transport the first item to a second sorting location associated with a second robotic device, similar to those described above in connection with FIG. 5, FIG. 6, and FIG. 9.

At block 1206, a processing circuitry (such as the processing unit 204 of the computing entity 109 described above in connection with FIG. 1 and FIG. 2) may determine whether the second robotic device is associated with a predefined indicator.

In some examples, the predefined indicator may comprise at least one of: (1) an indication that the second robotic device is offline, or (2) an error message associated with the second robotic device. In some examples, the processing circuitry may receive the predefined indicator from a data repository that may store status messages associated with robotic devices within the material handling system. In some examples, the processing circuitry may determine whether the second robotic device is associated with a predefined indicator based on status data received from the second robotic device.

In some examples, the predefined indicator may be based on and/or indicate one or more additional operational statuses associated with the second robotic device. For example, the processing circuitry may determine whether a processing time of the second robotic device (for example, determined based on FIG. 7 above) has exceeded a predetermined threshold. If so, the processing circuitry may determine that the second robotic device is associated with the predefined indicator. Additionally, or alternatively, the processing circuitry may determine whether a number of articles assigned to the second robotic device (for example, determined based on FIG. 7 above) has exceeded a predetermined threshold. If so, the processing circuitry may determine that the second robotic device is associated with the predefined indicator.

If, at block 1206, the processing circuitry determines that the first item is not associated with the predefined indicator, the method 1200 may proceed to block 1212, where the processing circuitry may cause the second robotic device to transport the first item.

If, at block 1206, the processing circuitry determines that the first item is associated with the predefined indicator, the method 1200 may proceed to block 1208. At block 1208, a processing circuitry (such as the processing unit 204 of the computing entity 109 described above in connection with FIG. 1 and FIG. 2) may determine a third robotic device from the one or more robotic devices, similar to those described above in connection with FIG. 5, FIG. 6, FIG. 7 and FIG. 8. For example, the processing circuitry may calculate a plurality of processing times associated with the one or more robotic devices, and may select the third robotic device associated with a least processing time among the plurality of processing times, similar to those described above in connection with FIG. 7.

At block 1210, a processing circuitry (such as the processing unit 204 of the computing entity 109 described above in connection with FIG. 1 and FIG. 2) may cause the third robotic device to transport the first item from the second sorting location to the sorting destination, similar to those described above in connection with FIG. 5.

The method 1200 may end at block 1214.

Referring now to FIG. 13 to FIG. 17, various examples of the present disclosure are illustrated. In particular, these examples may be related to a two-tier sortation system.

Figure 13:
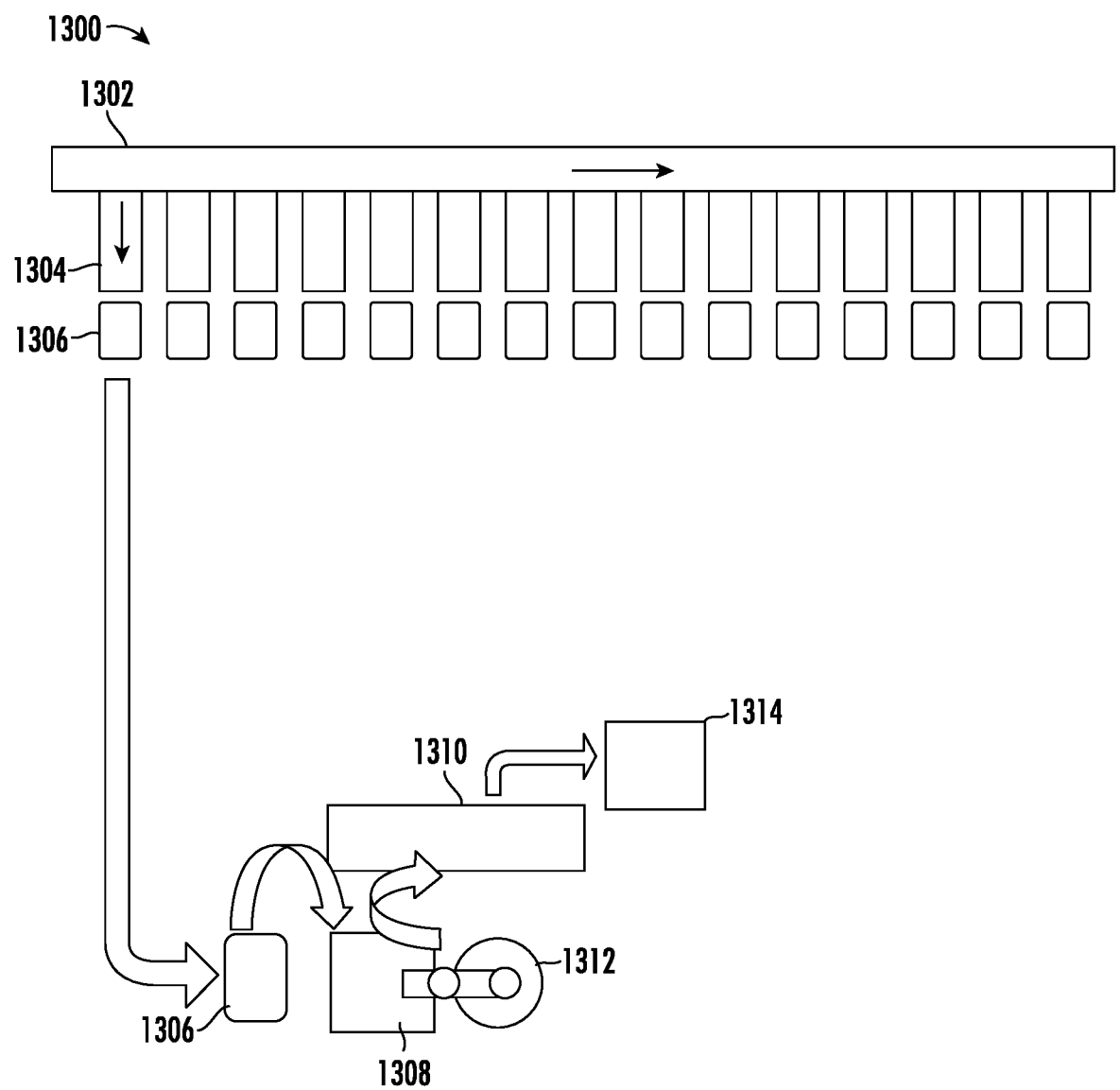
FIG. 13 illustrates an example primary sortation conveyor and secondary sortation station in accordance with various aspects and embodiments of the present disclosure.

Referring now to FIG. 13, illustrated is example embodiment 1300 of a primary sortation conveyor and a secondary sortation station in accordance with various aspects and embodiments of the present disclosure.

The conveyor 1302 can convey or transport items, packages, and other objects along the conveyor 1302, and may include a sortation system (e.g., shoe sorter, paddle sorter, or other sortation system) to sort subsets of the items from one or more divert paths 1304 into a sorting cell 1306. The items in the sorting cell 1306 may then be transported to a secondary sorting area where a robotic arm 1312 may perform a secondary sort and sort the items that are on a sorting table 1308 into a put wall 1310. After the items are sorted into the put wall 1310, these items may be manually tended, labeled, scanned, and/or transported to a final destination or into a gaylord 1314 for transportation.

In an embodiment, instead of the sorting cell 1306 being manually transported from the primary sort location to the secondary sorting location, a mobile robot may transport the items or objects in the sorting cell 1306 to the secondary sort location. The mobile robot may also be configured to dump the items from the cart onto the sorting table 1308.

In various embodiments, a sorting device can comprise a processor and a memory that stores executable instructions that, when executed by the processor, facilitate performance of operations. The operations can include facilitating pre-sorting of a group of items by a conveyor and a sorting system, and a subgroup of items of the group of items is directed to a first sorting location based on a first predefined criterion. The operations can also include facilitating, by a robotic arm, sorting of an item to a second sorting location based at least in part on a second predefined criterion, and the robotic arm may scan the item to determine label information, and may determine the second sorting location based on the label information.

For example, a processing circuitry may include a pre-sorting component that may determine which divert path or sorting cell to place one or more items that are being conveyed along a conveyor. The sorting cell destination may be based on a final destination of item(s), or based on a determination of a load being experienced by the associated secondary sorter (for example, a robotic arm). As an example, the processing circuitry may cause all items to be directed to a group of associated destinations to a single sorting cell, and the secondary sorter may sort the items into the separate destinations.

Figure 14:
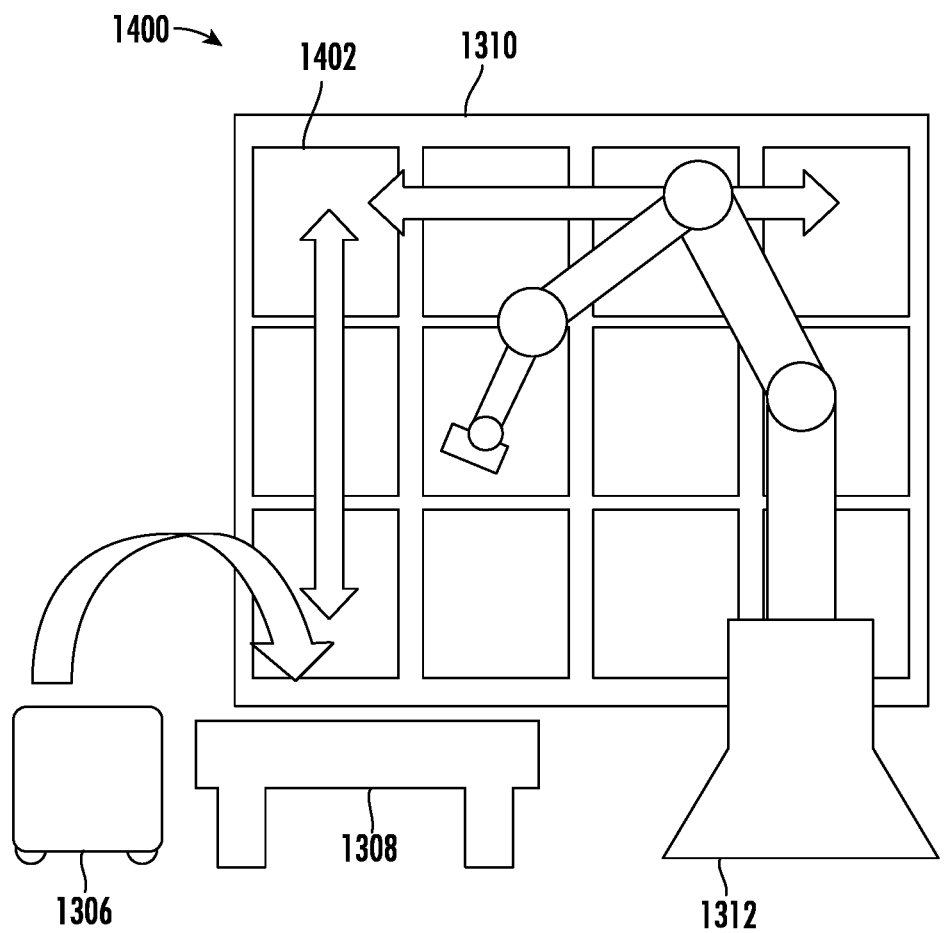
FIG. 14 illustrates an example secondary sortation station in accordance with various aspects and embodiments of the present disclosure.

Referring now to FIG. 14, illustrated is an embodiment 1400 of an example secondary sortation station in accordance with various aspects and embodiments of the present disclosure. In an embodiment, the robotic arm 1312 may sort items from the sorting table 1308 into one or more cells 1402 of the put wall 1310. The robotic arm 1312 may use a vision system to segment, pick, scan, and grasp the items, similar to those described above. In an embodiment, the items can be placed on the sorting table 1308 in a haphazard pattern with some stacking of the items. The robotic arm 1312 may recognize items, grasp them, and rotate or flip them in order to find a barcode or other label to scan. Once scanned, the robotic arm 1312, and/or an automation system may determine where the items is routed, or should be routed, and can be placed in an appropriate cell of the robotic put wall, similar to those described above. In an embodiment, the robotic arm can also attach a label to the items during the scan process.

Figure 15:
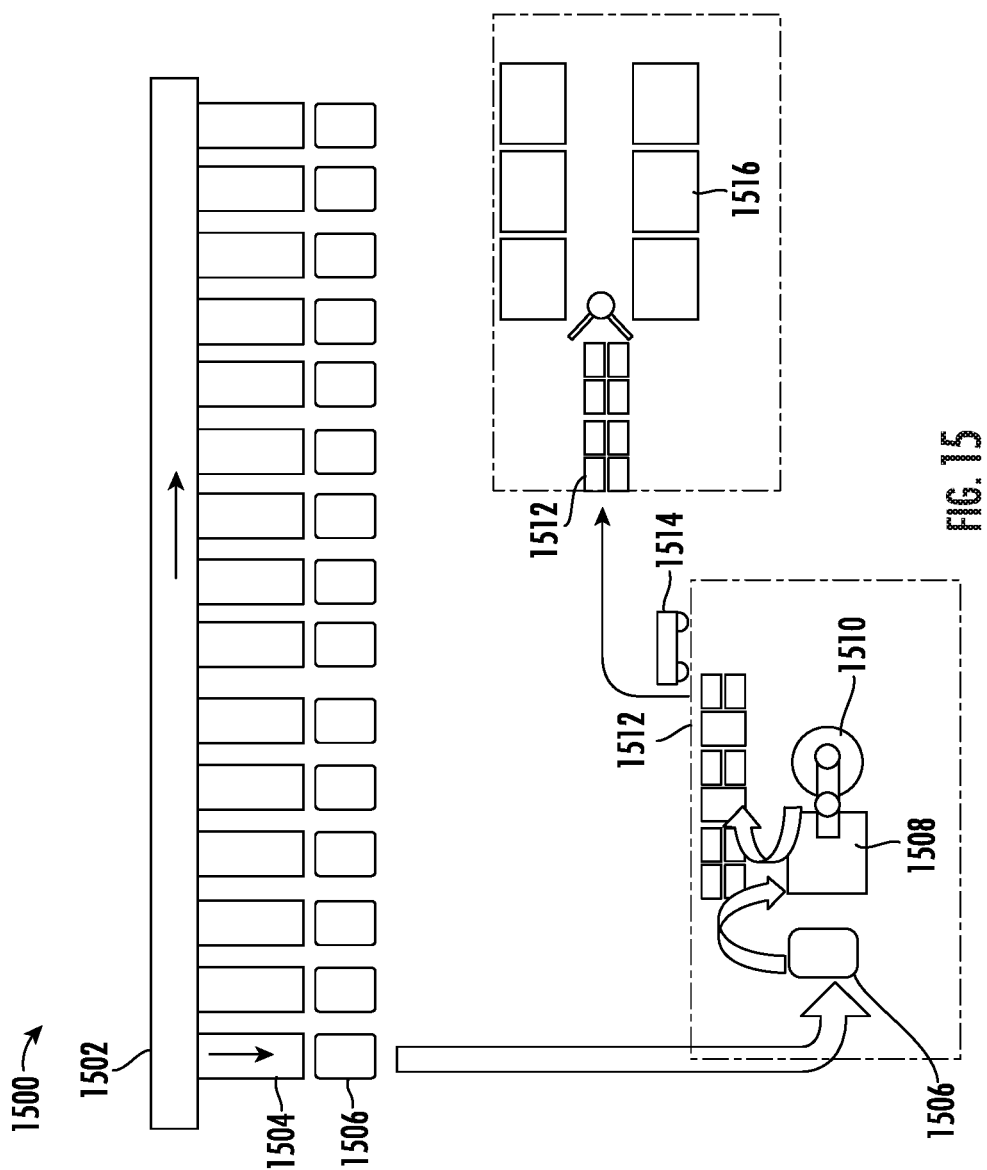
FIG. 15 illustrates another example primary sortation conveyor and secondary sortation station in accordance with various aspects and embodiments of the present disclosure.

Referring now to FIG. 15, illustrated is another embodiment 1500 of an example primary sortation conveyor and an example secondary sortation station in accordance with various aspects and embodiments of the present disclosure.

The conveyor 1502 may convey or transport items, packages, and other objects along the conveyor 1502, and may include a sortation system (e.g., shoe sorter, paddle sorter, or other sortation system) to sort subsets of the items from one or more divert paths 1504 into a sorting cell 1506. The items in sorting cell 1506 can then be transported to a secondary sorting area (manually or by an automated mobile robot) where a robotic arm 1510 may perform a secondary sort and sort the items that are on a sorting table 1508 into one or more mail sacks 1512 mounted on carts. Once sorted, the mail sacks 1512 may be transported (manually or by mobile robot 1514) to another sorting area where they can be tended, labeled, scanned, and or transported to a final destination or put into one or more gaylords 1516.

Figure 16:
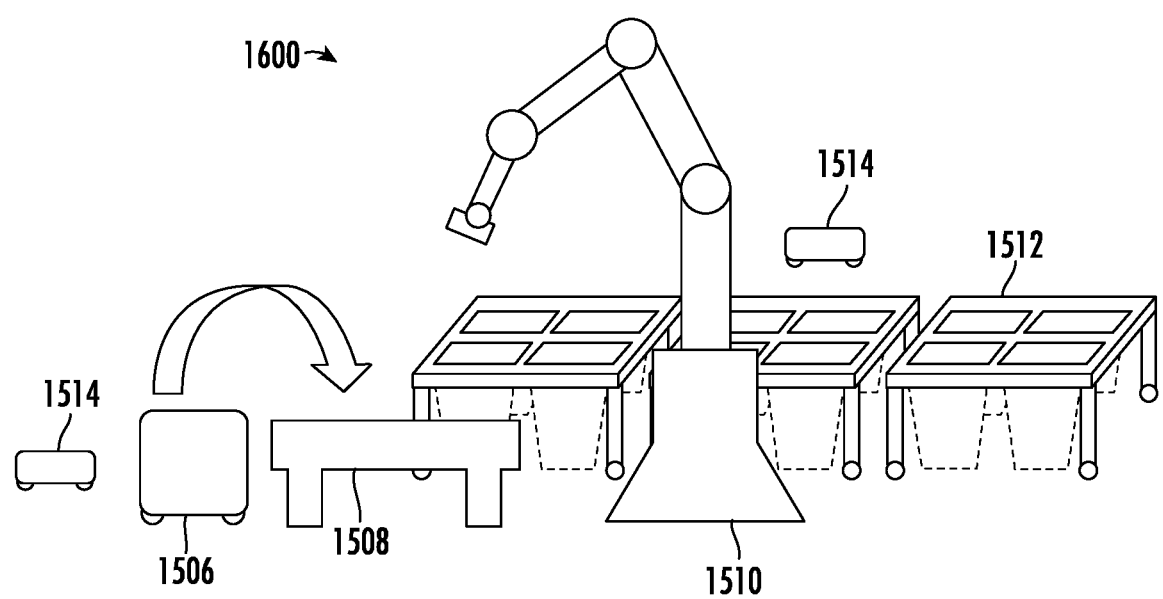
FIG. 16 illustrates an example secondary sortation station in accordance with various aspects and embodiments of the present disclosure.

Referring now to FIG. 16, illustrated is an embodiment 1600 of an example secondary sortation station in accordance with various aspects and embodiments of the present disclosure. In an embodiment, the robotic arm 1510 may sort items from the sorting table 1508 into one or more sacks 1512 or other sorting bins. The robotic arm 1510 may use a vision system to segment, pick, scan, and grasp the items. In an embodiment, the items can be placed on the table in a haphazard pattern with some stacking of the items. The robotic arm 1510 may recognize items, grasp them, and rotate or flip them in order to find a barcode or other label to scan. Once scanned, the robotic arm 1510 and/or an automation system can determine where the item is routed, or should be routed, and can be placed in an appropriate cell of the robotic put wall, similar to those described above. In an embodiment, the robotic arm can also attach a label (or provide another indicator) to the item during the scan process. A mobile robot 1514 may be configured to transport the sorting cell 1506 to the secondary sort location, or a sorting bin to the appropriate gaylord.

Figure 17:
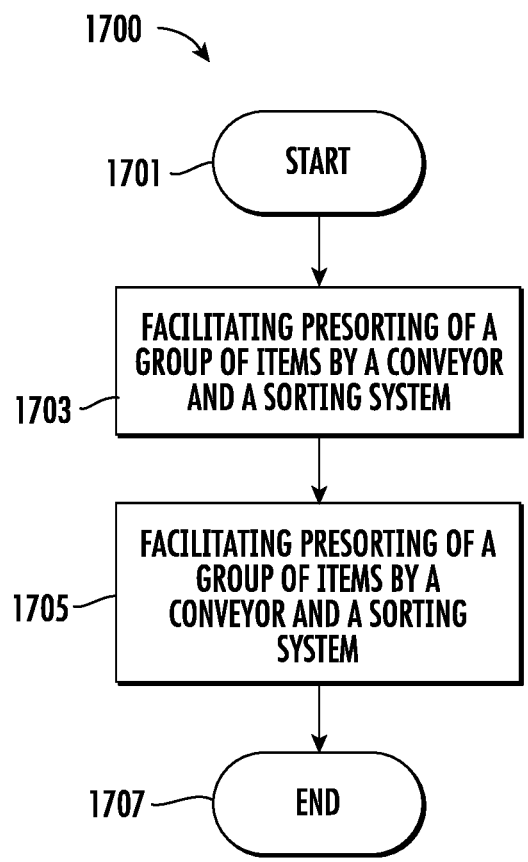
FIG. 17 illustrates an example method for performing a primary sort and a secondary sort in accordance with various aspects and embodiments of the present disclosure.

Referring now to FIG. 17, an example method 1700 in accordance with some embodiments of the present disclosure is illustrated. FIG. 17 illustrates an example method 1700 for performing a primary sort and a secondary sort in accordance with various aspects and embodiments of the present disclosure. The example method 1700 in FIG. 17 can be implemented, for example, by the systems in FIGS. 13-16. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

The method 1700 may begin at block 1701. At block 1703, the processing circuitry may facilitate presorting of a group of items by a conveyor and a sorting system, and a subgroup of items of the group of items may be directed to a first sorting location based on a first predefined criterion.

For example, as described above, the material handling system comprises a conveyor and a plurality of sorting cells connected to the conveyor via a plurality of divert paths. In some examples, the first sorting location may be associated with one of the plurality of sorting cells. In some examples, the conveyor may comprise at least one of: (1) a shoe sorter, or (2) a paddle sorter.

In some examples, the first predefined criterion may include, but not limited to, item identifications associated with these items and/or one or more characteristics associated with these items, similar to those described above.

At block 1705, the processing circuitry may facilitate presorting of a group of items by a robotic arm to a second sorting location based on a second predefined criterion. In some examples, an image capturing device (which may be, for example, incorporated into a robotic arm) may scan the item to determine its corresponding item identification, and may determine the second sorting location based on the item identification, similar to those described above.

In some examples, the second predefined criterion may include, but not limited to, item identifications associated with these items and/or one or more characteristics associated with these items, similar to those described above.

The method 1700 may end at block 1707

The above descriptions of various embodiments of the present disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

The invention claimed is:

1. An apparatus comprising at least one processor and at least one non-transitory memory comprising a computer program code, the at least one non-transitory memory and the computer program code configured to, with the at least one processor, cause the apparatus to:
   receive imaging data associated with a first item at a first sorting location of a material handling system;
   determine a sorting destination for the first item based at least in part on the imaging data;
   determine a plurality of first-tier robotic devices and a plurality of second-tier robotic devices from one or more robotic devices based at least in part on the first sorting location and the sorting destination;
   generate a first sortation scheme for the first item, wherein the first sortation scheme indicates a first sortation path associated with at least one of the plurality of first-tier robotic devices and at least one of the plurality of second-tier robotic devices of the material handling system; and
   cause the at least one of the plurality of first-tier robotic devices and the at least one of the plurality of second-tier robotic devices to transport the first item based at least in part on the first sortation scheme.

2. The apparatus of claim 1, wherein the at least one non-transitory memory and the computer program code are configured to, with the at least one processor, cause the apparatus to further determine an item identification associated with the first item based at least in part on the imaging data, wherein determining the sorting destination is further based on the item identification.

3. The apparatus of claim 2, wherein the imaging data comprises a scanned image of the first item, wherein, when determining the item identification, the at least one non-transitory memory and the computer program code are configured to, with the at least one processor, cause the apparatus to further identify an item label based on the scanned image.

4. The apparatus of claim 1, wherein the plurality of second-tier robotic devices is downstream of the plurality of first-tier robotic devices in the first sortation path.

5. The apparatus of claim 1, wherein the at least one non-transitory memory and the computer program code are configured to, with the at least one processor, cause the apparatus to further:
   select a first-tier robotic device from the plurality of first-tier robotic devices; and
   select a second sorting location associated with a second-tier robotic device of the plurality of second-tier robotic devices.

6. The apparatus of claim 5, wherein, when selecting the first-tier robotic device, the at least one non-transitory memory and the computer program code are configured to, with the at least one processor, cause the apparatus to further:

determine a corresponding load indicator associated with each of the plurality of first-tier robotic devices, wherein the corresponding load indicator indicates a number of items that are assigned to each of the plurality of first-tier robotic devices, wherein selecting the first-tier robotic device is based at least in part on the corresponding load indicator.

7. The apparatus of claim 6, wherein the at least one non-transitory memory and the computer program code are configured to, with the at least one processor, cause the apparatus to further calculate a corresponding processing time of each of the plurality of first-tier robotic devices based at least in part on the corresponding load indicator, wherein selecting the first-tier robotic device is further based on the corresponding processing time.

8. The apparatus of claim 5, wherein, when selecting the first-tier robotic device, the at least one non-transitory memory and the computer program code are configured to, with the at least one processor, cause the apparatus to further determine a corresponding schedule indicator associated with each of the plurality of first-tier robotic devices, wherein selecting the first-tier robotic device is based at least in part on the corresponding schedule indicator.

9. The apparatus of claim 8, wherein the corresponding schedule indicator indicates a maintenance schedule associated with each of the plurality of first-tier robotic devices.

10. The apparatus of claim 5, wherein, when selecting the second sorting location associated with the second-tier robotic device, the at least one non-transitory memory and the computer program code are configured to, with the at least one processor, cause the apparatus to further determine a corresponding load indicator associated with each of the plurality of second-tier robotic devices, wherein selecting the second sorting location is based at least in part on the corresponding load indicator.

11. The apparatus of claim 5, wherein, when selecting the second sorting location associated with the second-tier robotic device, the at least one non-transitory memory and the computer program code are configured to, with the at least one processor, cause the apparatus to further determine a corresponding schedule indicator associated with each of the plurality of second-tier robotic devices, wherein selecting the second sorting location is based at least in part on the corresponding schedule indicator.

12. The apparatus of claim 5, wherein the at least one non-transitory memory and the computer program code are configured to, with the at least one processor, cause the apparatus to further:

cause the second-tier robotic device to transport the first item from the second sorting location to the sorting destination.

13. The apparatus of claim 1, wherein, when generating the first sortation scheme for the first item, the at least one non-transitory memory and the computer program code are configured to, with the at least one processor, cause the apparatus to further:

determine a plurality of sorting locations based at least in part on the first sorting location and the sorting destination; and determine the first sortation path based at least in part on the plurality of sorting locations.

14. The apparatus of claim 13, wherein the at least one non-transitory memory and the computer program code are configured to, with the at least one processor, cause the apparatus to further:

determine a plurality of placement locations for the one or more robotic devices to execute the first sortation path.

15. The apparatus of claim 13, wherein the at least one non-transitory memory and the computer program code are configured to, with the at least one processor, cause the apparatus to further:

calculate a plurality of candidate paths associated with one or more of the plurality of sorting locations;

calculate a plurality of transport times associated with the plurality of candidate paths; and select a candidate path, from the plurality of candidate paths, that is associated with a least transport time among the plurality of transport times.

16. The apparatus of claim 15, wherein each of the plurality of candidate paths is associated with at least one robotic device of the one or more robotic devices.

17. The apparatus of claim 1, wherein the first sortation path is associated with a first robotic device and a second robotic device, wherein the second robotic device is downstream in the first sortation path of the first robotic device, wherein the at least one non-transitory memory and the computer program code are configured to, with the at least one processor, cause the apparatus to further:

cause the first robotic device to transport the first item to a second sorting location associated with the second robotic device;

in response to determining that the second robotic device is associated with a predefined indicator, determine a third robotic device from the one or more robotic devices; and cause the third robotic device to transport the first item from the second sorting location to the sorting destination.

18. The apparatus of claim 17, wherein the predefined indicator comprises at least one of: (1) an indication that the second robotic device is offline, or (2) an error message associated with the second robotic device.

19. The apparatus of claim 17, wherein, when determining the third robotic device from the one or more robotic devices, the at least one non-transitory memory and the computer program code are configured to, with the at least one processor, cause the apparatus to further:

calculate a plurality of processing times associated with the one or more robotic devices; and select the third robotic device associated with a least processing time among the plurality of processing times.

20. The apparatus of claim 1, wherein the at least one non-transitory memory and the computer program code are configured to, with the at least one processor, cause the apparatus to further generate a corresponding presorting scheme indicating the first sorting location for the first item.

* * * * *